United States Patent
Lee et al.

(10) Patent No.: US 9,973,658 B2
(45) Date of Patent: *May 15, 2018

(54) CRUM CHIP AND IMAGE FORMING DEVICE FOR AUTHENTICATION AND COMMUNICATION, AND METHODS THEREOF

(71) Applicant: S-PRINTING SOLUTION CO., LTD., Suwon-si, Gyeonggi-do (KR)

(72) Inventors: Jae-yoon Lee, Seoul (KR); Hong-rok Woo, Yongin-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/677,603

(22) Filed: Aug. 15, 2017

(65) Prior Publication Data

US 2017/0346990 A1 Nov. 30, 2017

Related U.S. Application Data

(63) Continuation of application No. 13/963,205, filed on Aug. 9, 2013, now Pat. No. 9,800,763, which is a
(Continued)

(30) Foreign Application Priority Data

Sep. 9, 2011 (KR) .................. 10-2011-0092060
Dec. 24, 2012 (KR) .................. 10-2012-0152433
Apr. 30, 2013 (KR) .................. 10-2013-0048712

(51) Int. Cl.
*G06K 15/00* (2006.01)
*H04N 1/44* (2006.01)
(Continued)

(52) U.S. Cl.
CPC ....... *H04N 1/4433* (2013.01); *G03G 15/0863* (2013.01); *G03G 21/1882* (2013.01)

(58) Field of Classification Search
CPC ........... G03G 21/1882; G03G 15/0863; H04N 1/4433
(Continued)

(56) References Cited

U.S. PATENT DOCUMENTS 6,267,463 B1 7/2001 Paulsen et al.
6,640,294 B2 10/2003 Debiez et al.
(Continued)

FOREIGN PATENT DOCUMENTS

CN 1235300 A 11/1999
CN 102112960 6/2011
(Continued)

OTHER PUBLICATIONS

Chinese Office Action dated Oct. 10, 2017 from Chinese Patent Application No. 201210331411.X, 13 pages.
(Continued)

*Primary Examiner* — Tammy Paige Goddard
*Assistant Examiner* — Bharatkumar S Shah
(74) *Attorney, Agent, or Firm* — Staas & Halsey LLP

(57) ABSTRACT

A Customer Replaceable Unit Monitoring (CRUM) chip, an image forming apparatus, and a method of authenticating are provided. The apparatus includes a main body that includes a main controller controlling operations of the apparatus, a consumable unit mounted on the main body to communicate with the main controller, and a CRUM chip that is provided in the consumable unit and stores information regarding the consumable unit. The main controller and the CRUM chip transmit and receive signals that include data and integrity detection data between each other. The integrity detection data is generated by using previous integrity detection data.

24 Claims, 29 Drawing Sheets

Related U.S. Application Data continuation-in-part of application No. 13/445,535, filed on Apr. 12, 2012, now Pat. No. 9,811,050.

(51) Int. Cl.
   *G03G 15/08* (2006.01)
   *G03G 21/18* (2006.01)

(58) Field of Classification Search
   USPC ........................................................ 358/1, 14
   See application file for complete search history.

(56) References Cited

U.S. PATENT DOCUMENTS

| | | | |
|---|---|---|---|
| 7,249,108 | B1 | 7/2007 | Walmsley et al. |
| 7,650,388 | B2 | 1/2010 | Rodriguez et al. |
| 8,069,477 | B2 | 11/2011 | Lee et al. |
| 8,069,478 | B2 | 11/2011 | Cho et al. |
| 8,073,355 | B2 | 12/2011 | Lee et al. |
| 8,176,549 | B2 | 5/2012 | Lee et al. |
| 8,330,966 | B2 | 12/2012 | Lee et al. |
| 8,332,934 | B2 | 12/2012 | Lee et al. |
| 8,386,781 | B2 | 2/2013 | Cho et al. |
| 8,422,058 | B2 * | 4/2013 | Zona ............ G03G 15/55 358/1.15 |
| 8,453,260 | B2 | 5/2013 | Lee et al. |
| 8,537,382 | B2 | 9/2013 | Tokairin |
| 8,973,152 | B2 | 3/2015 | Lee et al. |
| 9,141,816 | B2 | 9/2015 | Refstrup |
| 9,203,980 | B2 | 12/2015 | Lee et al. |
| 9,495,549 | B2 | 11/2016 | Refstrup |
| 9,619,663 | B2 | 4/2017 | Refstrup |
| 2003/0126400 | A1 | 7/2003 | Debiez et al. |
| 2003/0215245 | A1 | 11/2003 | Silence et al. |
| 2006/0136989 | A1 | 6/2006 | Rodriquez et al. |
| 2006/0193642 | A1 * | 8/2006 | Morimoto ............ G03G 15/553 399/12 |
| 2007/0047974 | A1 * | 3/2007 | Tanaka ............... G03G 21/1882 399/8 |
| 2007/0058991 | A1 | 3/2007 | Rommelmann et al. |
| 2009/0129559 | A1 | 5/2009 | Fukami et al. |
| 2009/0214249 | A1 | 8/2009 | Lee et al. |
| 2009/0220077 | A1 | 9/2009 | Lee et al. |
| 2009/0222664 | A1 | 9/2009 | Cho et al. |
| 2009/0222886 | A1 | 9/2009 | Lee et al. |
| 2010/0039485 | A1 | 2/2010 | Rodriquez et al. |
| 2010/0128298 | A1 | 5/2010 | Matsugashita |
| 2011/0002002 | A1 | 1/2011 | Lee et al. |
| 2011/0004746 | A1 | 1/2011 | Lee et al. |
| 2011/0004768 | A1 | 1/2011 | Cho et al. |
| 2011/0044703 | A1 | 2/2011 | Fuse |
| 2011/0093702 | A1 | 4/2011 | Eom et al. |
| 2011/0109938 | A1 | 5/2011 | Refstrup |
| 2012/0134687 | A1 | 5/2012 | Jones et al. |
| 2012/0222130 | A1 | 8/2012 | Lee et al. |
| 2013/0063770 | A1 | 3/2013 | Lee et al. |
| 2013/0070301 | A1 | 3/2013 | Lee et al. |
| 2013/0108285 | A1 | 5/2013 | Spink et al. |
| 2015/0343792 | A1 | 12/2015 | Refstrup |
| 2017/0032135 | A1 | 2/2017 | Refstrup |
| 2017/0300008 | A1 | 10/2017 | Lee et al. |

FOREIGN PATENT DOCUMENTS

| | | |
|---|---|---|
| CN | 102481956 A | 5/2012 |
| CN | 102682238 | 9/2012 |
| EP | 0281223 | 9/1988 |
| EP | 0 956 963 A1 | 11/1999 |
| JP | 11-334059 | 12/1999 |
| KR | 10-2006-0059668 | 6/2006 |
| KR | 10-2009-0094726 | 9/2009 |
| KR | 10-2011-0014535 | 2/2011 |
| KR | 10-2011-0023412 | 3/2011 |
| KR | 10-1780734 | 9/2017 |
| RU | 2 313 821 | 1/2006 |
| RU | 2 420 775 C2 | 6/2011 |
| WO | 2004/068334 A1 | 8/2004 |
| WO | WO 2009/145774 A1 | 12/2009 |

OTHER PUBLICATIONS

Russian Decision on Grant dated May 12, 2017 in corresponding Russian Application No. 2012138542.
Chinese Office Action dated May 26, 2017 in corresponding Chinese Patent Application No. 201210331411.X.
Chinese Office Action dated May 2, 2017 in corresponding Chinese Patent Application No. 201380073466.8.
Extended European Search Report dated Feb. 22, 2017 in corresponding European Application No. 16 19 7092.
Notice of Allowance dated Jan. 12, 2016 in related U.S. Appl. No. 13/721,289.
Notice of Allowance dated May 9, 2017 in related U.S. Appl. No. 13/445,535.
Corrected Notice of Allowance dated Dec. 8, 2016 in related U.S. Appl. No. 13/445,535.
Notice of Allowance dated Feb. 10, 2016 in related U.S. Appl. No. 13/445,535.
Extended European Search Report dated Feb. 22, 2017 in corresponding European Patent Application No. 16 197 092.6.
Chinese Office Action dated Dec. 13, 2016 in corresponding Chinese Patent Application No. 201210331411.X.
Korean Office Action dated Dec. 7, 2016 in corresponding Korean Patent Application No. 10-2011-0092060.
European Office Action dated Feb. 2, 2017 in corresponding European Patent Application No. 12 130 258.5.
Notice of Allowance dated Nov. 3, 2016 in related U.S. Appl. No. 13/445,535.
Russian Office Action dated Jul. 11, 2016 in corresponding Russian Patent Application No. 2012138542.
Office Action dated Jul. 29, 2016 in related U.S. Appl. No. 13/445,535.
Office Action dated Apr. 26, 2016 in Chinese Patent Application No. 201210331411.X.
Office Action dated Dec. 1, 2015 in Korean Patent Application No. 10-2011-0114192.
Office Action dated Feb. 22, 2016 in European Patent Application No. 13 177 300.4.
U.S. Office Action dated Sep. 29, 2015 in U.S. Appl. No. 13/721,289.
U.S. Office Action dated Aug. 28, 2014 in co-pending U.S. Appl. No. 13/721,289.
U.S. Office Action dated Mar. 13, 2015 in co-pending U.S. Appl. No. 13/721,289.
U.S. Final Office Action dated Sep. 29, 2015 in co-pending U.S. Appl. No. 13/721,289.
European Search Report dated May 4, 2015 in corresponding European Application No. 13177300.4.
European Examination Report dated Jun. 8, 2015 in corresponding European Application No. 13177300.4.
U.S. Notice of Allowance dated May 26, 2015 in co-pending U.S. Appl. No. 13/445,535.
Final Office Action dated Oct. 22, 2014 in related U.S. Appl. No. 13/445,535.
Korean Office Action dated Jul. 22, 2014 in related Korean Application No. 10-2013-0048712.
Office Action dated Mar. 13, 2014 in related U.S. Appl. No. 13/445,535.
International Search Report and Written Opinion dated Nov. 27, 2013 in related International Application No. PCT/KR2013/006430.
Extended European Search Report dated Jun. 29, 2012 in corresponding European Patent Application No. 12160258.5.
Office Action dated Aug. 22, 2014 in related U.S. Appl. No. 13/963,205.
Office Action dated Apr. 6, 2015 in related U.S. Appl. No. 13/963,205.
Advisory Action dated Jul. 15, 2015 in related U.S. Appl. No. 13/963,205.

(56) References Cited

OTHER PUBLICATIONS

Office Action dated Nov. 11, 2015 in related U.S. Appl. No. 13/963,205.
Notice of Allowance dated Jun. 23, 2016 in related U.S. Appl. No. 13/963,205.
Office Action dated Jul. 29, 2016 in related U.S. Appl. No. 13/963,205.
Notice of Allowance dated Nov. 23, 2016 in related U.S. Appl. No. 13/963,205.
Notice of Allowance dated Mar. 20, 2017 in related U.S. Appl. No. 13/963,205.
Notice of Allowance dated Jun. 12, 2017 in related U.S. Appl. No. 13/963,205.
U.S. Appl. No. 13/963,205, filed Aug. 9, 2013, Jae-yoon Lee, S-Printing Solution Co., Ltd.
Korean Office Action dated Nov. 10, 2017 from Korean Patent Application No. 10-2017-0118641, 9 pages.
Chinese Office Action dated Oct. 16, 2017 from Chinese Patent Application No. 201380073466.8, 19 pages.
Russian Notice of Allowance dated Nov. 2, 2016 in corresponding Russian Patent Application No. 2013139377, 21 pages.
U.S. Notice of Allowance dated Oct. 27, 2017 from U.S. Appl. No. 15/639,500.
U.S. Office Action dated Oct. 25, 2013 from U.S. Appl. No. 13/445,535.
U.S. Notice of Allowance dated Jun. 28, 2017 from U.S. Appl. No. 13/445,535.
U.S. Notice of Allowance dated Mar. 29, 2016 from U.S. Appl. No. 13/963,205.
U.S. Office Action dated Nov. 17, 2015 from U.S. Appl. No. 13/963,205.
U.S. Appl. No. 13/445,535, filing date Apr. 12, 2012, Jae-yoon Lee, S-Printing Solution Co., Ltd.
U.S. Appl. No. 15/639,500, filing date Jun. 30, 2017, Jae-yoon Lee, S-Printing Solution Co., Ltd.
U.S. Appl. No. 13/721,289, filing date Dec. 20, 2012, Jae-Hyeong Jeong, S-Printing Solution Co., Ltd.

* cited by examiner

CRUM CHIP AND IMAGE FORMING DEVICE FOR AUTHENTICATION AND COMMUNICATION, AND METHODS THEREOF

CROSS-REFERENCE TO RELATED APPLICATIONS

This is a continuation application of U.S. application Ser. No. 13/963,205 filed Aug. 9, 2013, which is a continuation-in-part of prior U.S. application Ser. No. 13/445,535, filed on Apr. 12, 2012, to which the benefit is claimed under 35 U.S.C. § 120. This application also is related to, and claims priority to Korean Patent Application No. 10-2011-0092060, filed on Sep. 9, 2011, Korean Patent Application No. 10-2012-0152433, filed on Dec. 24, 2012, and Korean Patent Application No. 10-2013-0048712, filed on Apr. 30, 2013, in the Korean Intellectual Property Office, the disclosures of which are incorporated herein by reference.

BACKGROUND

1. Field

The embodiments discussed herein relate to a CRUM chip and image forming device for authentication and communication and methods thereof, and more particularly, to a Customer Replaceable Unit Monitoring (CRUM) chip and image forming device for authentication and communication for detecting whether data is integral, using integrity detection data in a communication process, and a method thereof.

2. Description of the Related Art

As computers increasingly becoming widespread, the dissemination rate of peripheral devices of computers is also increasing. Computer peripheral devices include image forming devices such as printers, facsimiles, scanners, copy machines, and multi-function printers.

Image forming devices may use ink or toner to print images on paper. Ink or toner is used each time an image forming operation is performed, and thus runs out when used for more than a predetermined period of time. In such a case, the unit in which the ink or toner is stored has to be replaced. Such parts or components which are replaceable in the process of using an image forming device may be defined as consumable units or replaceable units. For convenience of explanation, these will be referred to as consumable units in this document.

In addition to these units which must be replaced due to depletion of ink or toner as discussed above, there are also consumable units having characteristics that change when the units are used for more than a certain period of time, and thus are replaced to achieve a satisfactory printing quality. Consumable units include color replacement for developing machines, and parts such as intermediate transfer belts.

In the case of laser image forming devices, electrification units, intermediate units or settlement units may be used, in which various types of rollers and belts used in each unit may be worn out or degenerated when used for more than the marginal life span. Accordingly, the quality of image may be severely deteriorated. A user must replace each component, that is, each consumable unit at an appropriate replacing period so that printing operation can be performed to produce clean images.

To manage consumable units more efficiently, memories may be attached to consumable units, so as to exchange information with the body of an image forming device.

That is, it is possible to record various usage information such as the number of printed paper, number of output dots, and usage period into the memory of the consumable unit, for management of a time to replace the consumable unit.

As an example, large-scale organizations such as public offices, universities, and enterprises employ Managed Printing Services (MPS) to attempt to manage a plurality of image forming apparatuses with ease. An integrated solution service using MSP may provide the functions of calculating usage fees of consumables for each group or each individual and charging them accordingly and the functions of checking the life spans of consumables and ordering consumables before they wear out. Such functions may be provided based on the exact consumables usage information.

For such information management, a controller provided in the body of an image forming device and a memory unit provided in the consumable unit communicate with each other. However, there are numerous variables in the communication process. For instance, there may be an attack by a hacker who tries to control the controller or the memory unit for malicious purposes.

In addition, there may be a noise interruption caused, for example, by an electronic circuit or a motor provided in an image forming device. Unexpected incidents such as an alien substance getting into a connection part between a main body and a consumable unit of an image forming device, a connection cutting off due to vibration during operations, and/or an electrical interference signal being applied through the connection part, may occur.

Communication data may change due to these variables. For instance, once a job is completed, a consumable unit may transmit information such as the number of printing pages, number of dots, and remaining toner volume to a controller, and copies the information to a nonvolatile memory of the controller. Upon the data being read as an incorrect value, for example, such as 0xFFFFFFFF, there is a risk that the controller may perceive that the life of the pertaining consumable unit has ended. In this case, the consumable unit will not longer be able to be used.

In addition, the consumable unit of an image forming device may have a structure that may be detachable. A memory of a consumable unit is not usually accessed and only the memory of an image forming device is used during a printing operation of the image forming device due, for example, to motor vibration and circuit noise that may occur during the operation. Thus, the communication between the memory of the consumable unit and the image forming device may be performed only in limited occasions, for example, when the consumable unit is mounted on the image forming device so that the memory of the consumable unit and the memory of the image forming device are synchronized with each other, or when the consumable unit is updated for changes after a printing operation is completed and a motor stops.

As there may be a considerable amount of data stored and managed in the consumable unit, various supplementary functions may be required, taking a prolonged communication time. Accordingly, when a consumable unit is replaced during communication, problems may occur. As an example, a consumable usage information of a consumable unit 1 indicates, for example, 100 printing pages, 200 output dots, and 300 motor driving times, and a consumable usage information of a consumable unit 2 indicates, for example, 200 printing pages, 300 output dots, and 400 motor driving times. In this example case, if the consumable unit 1 is mounted on an image forming device, the consumable unit 1 may be synchronized with the memory and data of the image forming device. If the consumable unit 1 is replaced with the consumable unit 2 in the process of synchronization, that is, only the data of 100 printing pages and 200 output dots of the consumable unit 1 is stored in the memory of the image forming device and then, the consumable unit 1 is replaced with the consumable unit 2, authentication may be performed again. Subsequently, the data of 400 motor driving time may be copied to the memory of the image forming device. As a result, the memory of the image forming device indicates, for example, 100 printing pages, 200 output dots, and 400 motor driving times, which are not the correct values. In this example case, if the consumable unit 2 is updated for changes after a printing operation is completed in the image forming device, the data of 100 printing pages and 200 output dots stored in the memory of the image forming device may be stored in the consumable unit 2 while the actual data of the consumable unit 2 indicates 200 printing pages and 300 output dots. As the printing pages become 100 instead of 200, the corresponding consumable unit has incorrect data values and thus, may cause problems.

In addition, an image forming device may have and use a plurality of consumable units in one Inter-Integrated Circuit (I2C) channel, in which case, the consumable units may be categorized by a slave address in the I2C channel. In this case, if a slave address is modified to the ID of another consumable unit due to some temporal problems, wrong data may be stored in the memory of the another consumable unit.

Further, regarding a consumable unit of which the life span has ended, a hacker may attempt to reset the consumable user information, for example, to a value of "0" with a malicious purpose, in order to inappropriately recycle the consumable unit. Accordingly, a user may attempt to use a consumable unit of which the life has ended, causing problems such as breakdown of the image forming device or deterioration of definition, and the user may not be provided with exact information regarding consumable units, and moreover, an integrated solution service may not be available due to the problems of MPS caused by incorrect consumable information.

Accordingly, the necessity for a technology which efficiently detects communication errors between a consumable unit, and an image forming device to seek safety of the data is required.

SUMMARY

Additional aspects and/or advantages will be set forth in part in the description which follows and, in part, will be apparent from the description, or may be learned by practice of the invention.

An aspect of an exemplary embodiments relates to a CRUM chip and an image forming device for safety of communication, using integrity detection data, and a communication method thereof.

An image forming apparatus according to an exemplary embodiment includes a main body that includes a main controller capable of controlling operations of the image forming apparatus, a consumable unit that is mounted on the main body to communicate with the main controller, and a Customer Replaceable Unit Monitoring (CRUM) chip that is provided in the consumable unit and stores information regarding the consumable unit, and the main controller and the CRUM chip perform data communication if authentication is successful, wherein the authentication is performed through a plurality of authentication processes, and integrity detection data which is generated by reflecting previous integrity detection data is used in at least two authentication processes from among the plurality of authentication processes.

The main controller and the CRUM chip may generate final integrity detection data by accumulatively reflecting all integrity detection data that has been transmitted or received in previous authentication processes in a final authentication process from among the plurality of authentication processes.

The main controller and the CRUM chip may transmit/receive a signal including the integrity detection data in an authentication process for generating a session key and an authentication process for verifying compatibility from among the plurality of authentication processes.

The main controller and the CRUM chip may perform at least one authentication process between the authentication process for generating a session key and the authentication process for verifying compatibility.

When the authentication process for generating a session key begins, the main controller may transmit a signal including first data and first integrity detection data to the CRUM chip, and the CRUM chip may generate second integrity detection data using second data and the first integrity detection data and transmit a signal including the second data and the second integrity detection data to the main controller, and each of the first data and the second data may include data related to a session key in order to generate a session key.

When the authentication process for verifying compatibility begins, the main controller may generate third integrity detection data using third data, the first integrity data and the second integrity data and transmit a signal including the third data and the third integrity detection data to the CRUM chip, the CRUM chip may generate fourth integrity detection data using fourth data, and the first to the third integrity detection data and transmit a signal including the fourth data and the fourth integrity detection data, and the third data may include index information in a table pre-stored in the image forming apparatus, and the fourth data may include a value corresponding to the index information.

Each of the main controller and the CRUM chip, when a signal including the integrity detection data is received from a counterpart, may separate the integrity detection data from the received signal and compare the separated integrity detection data with integrity detection data which is generated on its own from remaining data in order to verify integrity of the signal.

An image forming apparatus according to an exemplary embodiment includes an interface unit that is connected to a CRUM chip mounted on a consumable unit built in the image forming apparatus and a controller which, when an event where authentication is required occurs, authenticates the CRUM chip by performing a plurality of authentication processes of the CRUM chip, and the controller transmits/receives a signal including integrity detection data in an authentication process for generating a session key and an authentication process for verifying compatibility from among the plurality of authentication processes, and the integrity detection data is generated by accumulatively reflecting at least one integrity detection data included in a previously-received signal.

A CRUM chip mountable on a consumable unit of an image forming apparatus according to an exemplary embodiment includes an interface unit which receives a signal including first data and first integrity detection data regarding the first data from a main body of the image forming apparatus, a test unit which separates the first integrity detection data from the received signal in order to verify integrity of the signal, a generating unit which generates second integrity detection data using second data for authentication with a main body of the image forming device and the first integrity detection data, and a controller which performs authentication by transmitting a signal including the second data and the second integrity detection data to a main body of the image forming device through the interface unit.

Each of the first data and the second data may include data related to a session key in order to generate a session key, and the controller may generate the session key using the first data and the second data, and perform a plurality of subsequent authentication processes, The plurality of subsequent authentication processes may comprise a second authentication process for synchronizing a first table stored in each of a main body of the image forming device and the CRUM chip, a third authentication process for synchronizing a second table stored in each of the main body of the image forming device and the CRUM chip, and a fourth authentication process for determining compatibility between the image forming device and the CRUM chip based on at least one of the first and the second tables.

The controller may generate and transmit final integrity detection data by reflecting all integrity detection data which has been transmitted and received in the fourth authentication process.

A method for authenticating an image forming apparatus according to an exemplary embodiment includes determining whether an event that requires authentication of a consumable unit mounted on the image forming device occurs, and upon the event occurring, performing authentication of a CRUM chip mounted on the consumable unit by a main controller of the image forming device to authentication the CRUM chip, and the authentication is performed through a plurality of authentication processes, and integrity detection data generated by reflecting previous integrity detection data is used in at least two authentication processes from among the plurality of authentication processes.

Integrity detection data which is transmitted/received in a final authentication process from among the plurality of authentication processes may be generated by accumulatively reflecting all integrity detection data which has been transmitted or received in previous authentication processes.

The authenticating may comprise a first authentication operation in which the main controller transmits a signal including first data and first integrity detection data to the CRUM chip, and the CRUM chip generates second integrity detection data using second data and the first integrity detection data and transmits a signal including the second data and the second integrity detection data to the main controller and a second authentication operation in which the main controller generates third integrity detection data using third data, the first integrity detection data and the second integrity detection data and transmits a signal including the third data and the third integrity detection data to the CRUM chip, and the CRUM chip generates fourth integrity detection data using fourth data and the first to the third integrity detection data and transmits a signal including the fourth data and the fourth integrity detection data to the main controller, wherein each of the first data and the second data includes data related to a session key in order to generate a session key, wherein the third data includes index information in a table pre-stored in the image forming apparatus, and the fourth data includes a value corresponding to the index information A method for authenticating a CRUM chip mountable on a consumable unit of an image forming apparatus according to an exemplary embodiment includes receiving a signal including first data and first integrity detection data for authentication from a main body of the image forming apparatus, testing integrity of the signal by separating the first integrity detection data from the received signal, generating second integrity detection data using second data and the first integrity detection data for authentication with a main body of the image forming apparatus, and performing authentication by transmitting a signal including the second data and the second integrity detection data to a main body of the image forming apparatus.

The method may include performing a plurality of subsequent authentication processes after transmitting a signal including the second data and the second integrity detection data to a main body of the image forming apparatus, and integrity detection data which is transmitted/received in a final authentication process from among the plurality of subsequent authentication processes may be generated by accumulatively reflecting all of integrity detection data which is transmitted or received in previous authentication processes.

The final authentication process may include receiving third data, the first integrity detection data and a signal including third integrity detection data generated using the second integrity detection data and the third data from a main body of the image forming apparatus, and generating fourth data and fourth integrity detection data using the first to the third integrity detection data and transmitting a signal including the fourth data and the fourth integrity detection data to a main body of the image forming apparatus, and each of the first data and the second data may include data related to a session key in order to generate a session key, and the third data may include index information in a table pre-stored in the image forming apparatus, and the fourth data may include a value corresponding to the index information.

An image forming device according to an exemplary embodiment includes a main body that includes a main controller capable of controlling operations of the image forming apparatus, and a consumable unit where a Customer Replaceable Unit Monitoring (CRUM) chip is mounted, and the main controller, when an event where authentication of the CRUM chip is required occurs, transmits a first signal including first data and first integrity detection data to the CRUM chip, and the CRUM chip generates second integrity detection data using second data and the first integrity detection data and transmits the second data and a second signal including the second data and the second integrity detection data to the main controller in order to perform an authentication process to generate a session key, and the main controller transmits a third signal including third integrity detection data and the third data which is generated using the first integrity detection data and the second integrity detection data to the CRUM chip, generates fourth integrity detection data using the first to the third integrity detection data, and transmits a fourth signal including the fourth data and the fourth integrity detection data to the main controller in order to perform an authentication process to determine compatibility.

The first data may include a first command, first authentication data, and a first assignor for assigning the first integrity detection data, and the second data may include second authentication data and a second assignor for assigning the second integrity detection data based on an operation result according to the first command, the third data may include a second command, third authentication data, and a third assignor for assigning the third integrity detection data, and the fourth data may include fourth authentication data and a fourth assignor for assigning the fourth integrity detection data based on an operation result according to the second command.

As aforementioned, according to various exemplary embodiments of the present disclosure, it is possible to pursue safety of an entire communication by accumulatively using integrity detection data used in previous communications. Accordingly, information of consumable units and image forming devices can be managed safely.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
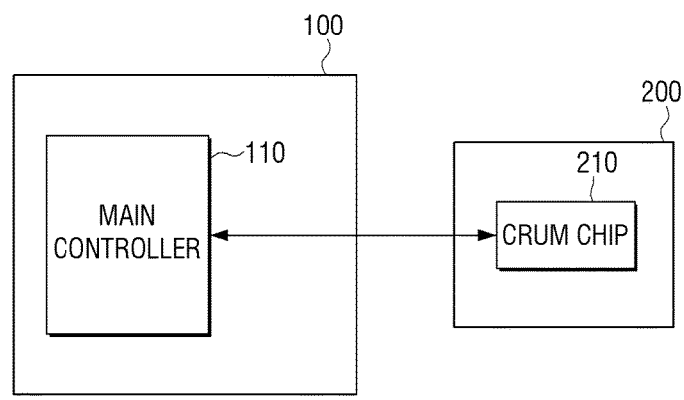
FIG. 1 illustrates an image forming device according to an exemplary embodiment.

Reference will now be made in detail to the embodiments, examples of which are illustrated in the accompanying drawings, wherein like reference numerals refer to the like elements throughout. The embodiments are described below to explain the present invention by referring to the figures.

Exemplary embodiments are discussed in detail below with reference to the accompanying drawings.

In the following description, like drawing reference numerals are used for the similar elements. The matters defined in the description, such as detailed construction and elements, are provided to assist in a comprehensive understanding of exemplary embodiments.

FIG. 1 illustrates a configuration of an image forming device according to an exemplary embodiment. As illustrated in FIG. 1, for example, an image forming device includes a body 100, a controller 110 provided in the body 100, and a consumable unit 200 that can be mounted on the body 100. An image forming device can be embodied as various types of devices such as a printer, scanner, multi-function device, facsimile, or copy machine, which can form images on paper or on other various recording media. According to an exemplary embodiment the body 100 may be a main body of the image forming device and the controller 110 may be a main controller.

The controller 110 may be mounted on the body 100 of the image forming device to control functions of the image forming device. According to an exemplary embodiment, the controller 110 is a main controller that controls all functions of the image forming device.

The consumable unit 200 may be mounted on the body 100 of the image forming device, and can be one of various types of units which involve in the image forming device either directly or indirectly. For instance, in the case of a laser image forming device, electrification units, light exposure units, developing units, transfer units, settlement units, various types of rollers, belts, and OPC drums can be consumable units. Furthermore, various types of units that must be replaced in using an image forming device can be defined as a consumable unit 200.

Each consumable unit 200 may have a predetermined life span. Therefore, a consumable unit 200 may include a microprocessor and/or circuit such as a CRUM chip (Customer Replaceable Unit Monitoring chip) 210 which enables replacement at an appropriate time.

A CRUM chip 210 may be mounted on a consumable unit 200 and record various information. A CRUM chip 210 includes a memory. Therefore, a CRUM chip 210 may be referred to in various terms such as a memory unit, or CRUM memory (Customer Replaceable Unit Monitoring memory), but for the sake of convenience of explanation, the term "CRUM chip" will be used.

In the memory provided in the CRUM chip, various characteristics information regarding the consumable unit 200, the CRUM chip itself, or the image forming device, and also usage information or programs regarding conducting an image forming job may be stored.

Various programs stored in the CRUM chip may include not only general applications, but also O/S (Operating System) programs and encryption programs. Information on the manufacturer of the consumable unit 200, information on manufacturer of the image forming device, names of mountable image forming devices, information on the manufactured date, serial number, model name, electronic signature information, encryption key, and encryption key index may be included in the characteristics information. The usage information may include information such as how many sheets of paper have been printed so far, how many sheets of paper can be printed from now on, and how much toner is left. The characteristics information may also be referred to as unique information instead.

According to an exemplary embodiment, information as illustrated below in Table 1 can be stored in a CRUM chip 210.

TABLE 1

| General Information | |
| --- | --- |
| OS Version | CLP300_V1.30.12.35 Feb. 22, 2007 |
| SPL-C Version | 5.24 Jun. 28, 2006 |
| Engine Version | 6.01.00(55) |
| USB Serial Number | BH45BAIP914466B. |
| Set Model | DOM |
| Service Start Date | 2007 Sep. 29 |
| Option | |
| RAM Size | 32 Mbytes |
| EEPROM Size | 4096 bytes |
| USB Connected (High) | |
| Consumables Life | |
| Total Page Count | 774/93 Pages (Color/mono) |
| Fuser Life | 1636 Pages |
| Transfer Roller Life | 864 Pages |
| TrayI Roller Life | 867 Pages |
| Total Image Count | 3251 Images |
| Imaging Unit/Deve Roller Life | 61 Images/19 Pages |
| Transfer Belt Life | 3251 Images |
| Toner Image Count | 14/9/14/19 Images(C/M/Y/K) |
| Toner Information | |
| Toner Remains Percent | 99%/91%/92%/100% (C/M/Y/K) |
| Toner Average Coverage | 5%/53%/31%/3% (C/M/Y/K) |
| Consumables Information | |
| Cyan Toner | SAMSUNG(DOM) |
| Magenta Toner | SAMSUNG(DOM) |
| Yellow Toner | SAMSUNG(DOM) |
| Black Toner | SAMSUNG(DOM) |
| Imaging unit | SAMSUNG(DOM) |
| Color Menu | |
| Custom Color | Manual Adjust (CMYK: 0, 0, 0, 0) |
| Setup Menu | |
| Power Save | 20 Minutes |
| Auto Continue | On |
| Altitude Adj. | Plain |

In the memory of the CRUM chip 210, approximate information of the consumable unit 200, and information on the life, information, and setup menu of the consumable unit 200 may be stored. Besides the body of the image forming device, an O/S provided for use in the consumable unit may be stored in the memory.

The CRUM chip may include a CPU (not illustrated) that can manage the memory, perform various programs stored in the memory, and perform communication with a body of an image forming device or a controller of other devices.

The CPU may drive the O/S stored in the memory of the CRUM chip, and perform initialization of the consumable unit 200 itself, apart from the initialization of the image forming device. The CPU may perform authentication between the body of the image forming device when the initialization has completed or during the initialization. Once the initialization is complete, it may perform encryption data communication with the body of the image forming device. Various commands and data transmitted from the body of the image forming device may be encrypted according to an arbitrary encryption algorithm and be transmitted.

In a particular event, for example, such as when power of the image forming device having the consumable unit 200 is on, or when the consumable unit 200 is detached and then attached to the body 100 of the image forming device again, the CPU may perform initialization for itself apart from the initialization of the controller 100. The initialization includes various processes such as initial driving of various application programs used in the consumable unit 200, calculating secret information needed in data communication with the controller 110 after the initialization, setting up a communication channel, initializing a memory value, checking when to replace itself, setting an inner register value of the consumable unit 200, and setting a inner-outer clock signal.

Setting a register value may be defined as an operation of setting functional register values inside the consumable unit 200 so that the consumable unit 200 can operate according to various functional states that a user predetermined. The setting an inner-outer clock signal refers to an operation of adjusting a frequency of an outer clock signal provided from the controller 110 of the image forming device to be in line with the inner clock signal that the CPU inside the consumable unit 200 uses.

Checking when to replace itself may be an operation of identifying the remaining volume of a toner or ink used so far, anticipating when the ink or toner will run out, and notifying the controller 110. Upon determining in the initialization process that the toner volume has already run out, the consumable unit 200 may be embodied to notify the controller 110 that it is in a non-operable state. Since the consumable unit 200 itself has the O/S, various types of initialization may be performed according to the types and characteristics of the consumable unit 200.

Upon the CPU being mounted and the O/S provided, the remaining volume of the consumable unit stored in the memory unit 210 may be identified or the number of refilling times, before the controller 110 requests communication with the unit 200, when the image forming device is turned on. Accordingly, the time of notifying shortage of the consumable unit may be done earlier than before. For instance, when the toner is running short, a user may turn the power on, and then make adjustments for conversion to a toner saving mode and then perform image forming. The same applies to when only a particular toner is running short as well.

The CPU may not respond to a command of the controller 110 until the initialization is under process and then completed. The controller 110 waits for a response while periodically transmitting the command until there is a response.

Accordingly, when a response, that is, an acknowledgement is received, authentication may be performed between the controller 110 and the CPU. In this case, due to the O/S of itself installed in the CRUM chip 210, it is possible to perform authentication through interaction between the CRUM unit 210 and the controller 110.

The controller 110 encrypts data or a command for authentication and transmits it to the CRUM chip 210. In the transmitted data, an arbitrary value R1 may be included. Herein, the R1 may be a random value which changes at every authentication, or a predetermined fixed value. The CRUM chip that received the data generates a section key using an arbitrary value R2 and the received R1, and then generates an MAC (Message Authentication Code) using the generated section key.

A signal including the MAC generated and the R2 as aforementioned is transmitted to the controller 110. The controller 110 generates the section key using the received R2 and R1, generates the MAC using the generated section key, and then certifies the CRUM chip 210 by comparing the generated MAC and the MAC in the received signal. According to various exemplary embodiments, electronic signature information or key information may be transmitted in such an authentication process and used in the authentication.

Once authentication is made successfully, the controller 110 and the CRUM chip perform an encryption data communication for data management. That is, when a user command has been input or when an image forming job has been initiated or completed, the controller 110 encrypts the command or data for performing data reading, writing, or additional functions using an encryption algorithm, and then transmits it to the CRUM chip 210.

The CRUM chip 210 may decode the received command or data, and perform operations such as data reading or writing corresponding to the decoded command. The encryption algorithm used in the CRUM chip 210 or the controller 110 may be a standardized encryption algorithm. Such an encryption algorithm is changeable when the encryption key has been leaked or when there is a need to strengthen security. Various encryption algorithms such as RSA asymmetric key algorithm, ARIA, TDES, SEED, AES symmetric key algorithm may be used.

As such, between the CRUM chip 210 and the controller 110, communication for authentication and data exchange may be performed numerous times. In every communication, signals are transmitted from the controller 110 to the CRUM chip 210 or vice versa. In this case, a transmitted signal includes error detection data for detecting integrity of the data included in the corresponding signal. Such error detection data is data generated by accumulatively reflecting error detection data included in the transmitted or received signal from the previous communication. Herein, error detection data is data for detecting integrity of the data, and thus can be diversely named as integrity detection data, integrity detection test data, and test data, etc. For convenience of explanation, the data is named as integrity detection data.

Herein, accumulatively reflecting means generating new integrity detection data using the entire integrity detection data used in previous communications. In other words, accumulatively reflecting means that if integrity detection data has been previously received/transmitted for several times, the entire integrity detection test data previously received/transmitted is used for generating new integrity detection test data.

Various methods can be used for the method of accumulatively reflecting. Specifically, the controller 110 or the CRUM chip 210 can apply various logical operations such as XOR for the data to be transmitted and the previous integrity detection data, and use the result value as new integrity detection data. In this case, integrity detection data can be indicated in the same size as the previous integrity detection data. In addition, integrity detection data may vary according to the previous integrity detection data, and consequently, it can be seen that the previous integrity detection data is accumulatively reflected.

In the other embodiment, the main controller 110 and the CRUM chip 210 can apply a predetermined mathematical formula for data to be transmitted and the previous integrity detection data, and use the result value as new integrity detection data. Alternatively, by applying known various algorithms such as hash algorithm for the previous integrity detection data and data to be transmitted, the result value of encrypting the data can be used as new integrity detection data. Alternatively, simply, data to be transmitted and the previous integrity detection data can be added and the result value can be used as new integrity detection data.

That is, between the controller 110 and the CRUM chip 210, a plurality of communications may be performed such as authentication 1, authentication 2, authentication 3, . . . , authentication n, data communication 1, data communication 2, . . . data communication m. According to an exemplary embodiment, in a signal transmitted at every communication or in some process of the communication, integrity detection data may be included. In such an integrity detection data, the integrity detection data used in the previous communication is reflected accumulatively. Detailed methods of accumulatively reflecting will be described in higher detail later with reference to the accompanying drawings.

The side that received the signal detects integrity of the corresponding signal using integrity detection data in the signal. Accordingly, when the corresponding data is determined to be integral, a next operation or subsequent communication is performed. If it is necessary to record the received data, the data and integrity detection data included in that signal may be temporarily stored. A new integrity detection data may be generated using a subsequent data to be transmitted to the side which transmitted the signal and the integrity detection data received from the previously communication and temporarily stored. Accordingly, a signal to which the new integrity detection data has been added may be transmitted to the subsequent data. Between the controller 110 and the CRUM chip 210, such communication which includes such integrity detection data may be performed a plurality of times. When the communication including the last integrity detection data is performed, a final detection may be performed using the integrity detection data included in the last signal received. If there is nothing wrong with the final detection, all data which has been temporarily stored until then may be recorded.

Figure 2:
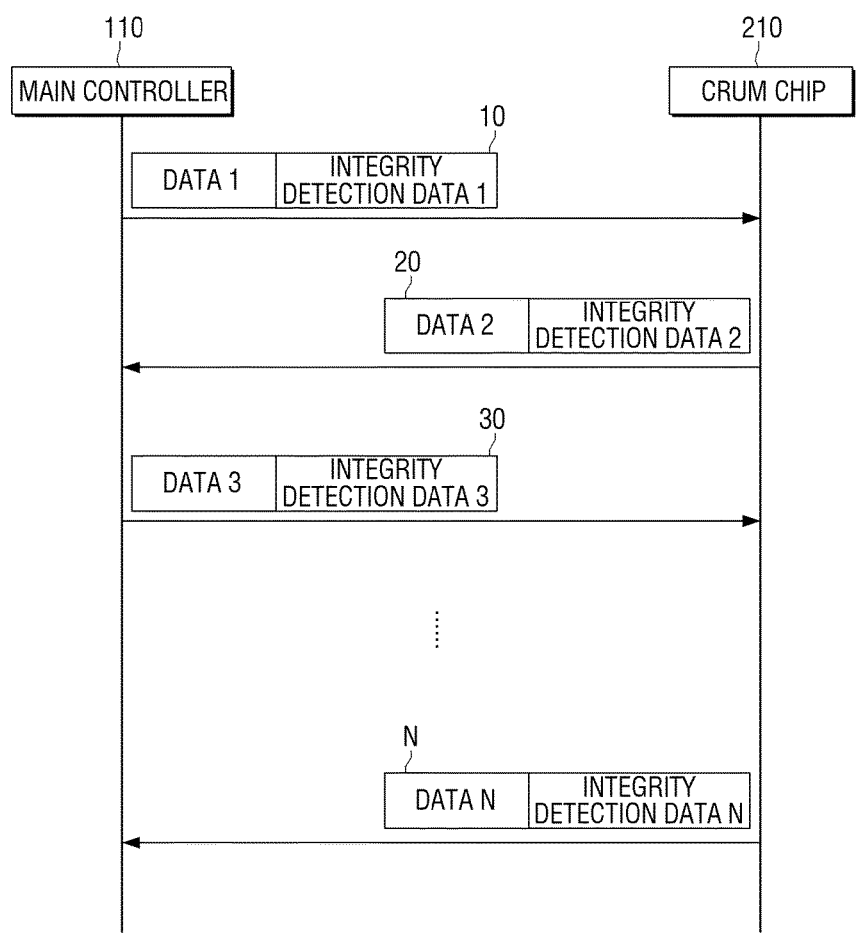
FIG. 2 is a timing view illustrating a communication process between a controller and a CRUM chip in an image forming device according to an exemplary embodiment.

FIG. 2 illustrates an exemplary communication process between the controller 110 and the CRUM chip 210 according to an exemplary embodiment of the present disclosure. According to FIG. 2, the controller 110 transmits a first signal 10 which includes data 1 and integrity detection data 1. The CRUM chip 210 which received the first signal 10 generates integrity detection data 2 using the integrity detection data 1 included in the first signal 10 and data 2. The CRUM chip 210 transmits a second signal which includes the data 2 and the integrity data 2 to the controller 110. As such, the signals (30, . . . , N) which include integrity detection data generated using the integrity detection data from the previous communication are performed for a plurality of times.

A result value of logical operation on data to be transmitted, a result value generated by applying a predetermined mathematically formula to the data or a result value of encrypting the data, that is, MAC may be used as integrity detection data.

Figure 3:
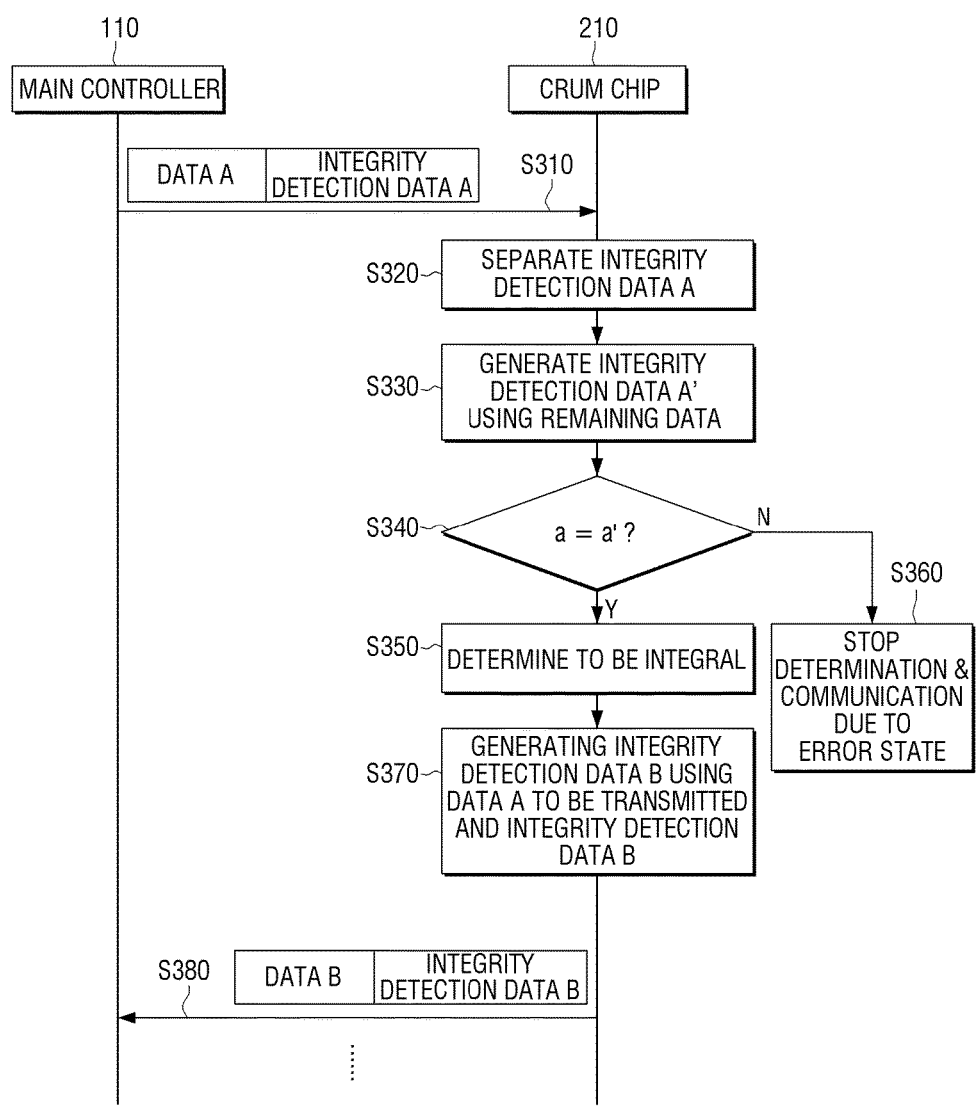
FIG. 3 is a timing view illustrating a process of examining integrity of a signal using an integrity detection data.

FIG. 3 illustrates a detection method using integrity detection data. According to FIG. 3, when a signal which includes data a and integrity detection data a is received (S310), the CRUM chip 210 separates the integrity detection data a (S320).

The CRUM chip 210 generates integrity detection data a' using the remaining data and integrity detection data that it had transmitted during the previous communication (S330). The CRUM chip 210 then compares the integrity detection data a' generated accordingly with the separated integrity detection data a (S340), and if they are identical, determines to be integral (S350). If they are not identical, the CRUM chip 210 determines that the data is in an error state, and stops the communication (S360). For the convenience of explanation, hereinafter, the integrity detection data a' will be referred to as the data subject to comparison.

When it is determined that the corresponding data is integral, integrity detection data b is generated by using data b to be transmitted and the detection data a (S370). Accordingly, a signal which includes the data b and the integrity detection data b is transmitted to the controller 110 (S380).

FIG. 3 illustrates an exemplary detection process performed, for example, in the CRUM chip 210, but the same process may be performed in the controller 110 as well. That is, when the controller 110 receives a signal which includes the data b and the integrity detection data b, it separates the integrity detection data b, and performs detection. This detection method is similar to (S330) to (S370), and thus repeated explanation and illustration will be omitted.

The configuration of signals transmitted and received between the controller 110 and the CRUM chip 210 may be designed in various types. That is, data included in the signals may include at least one of a command, information to be recorded, result information on operations according to the command, result information on integrity detection regarding previously received signals, and indicator information for notifying a location of the integrity detection data. The result information on integrity detection may be excluded from the signals initially transmitted and received between the controller 110 and the CRUM chip 210. The method for detecting integrity data may be used for every communication operation in the above communication process, but may also be applied only to some or important communication operations during the entire communication process, if necessary.

Figure 4:
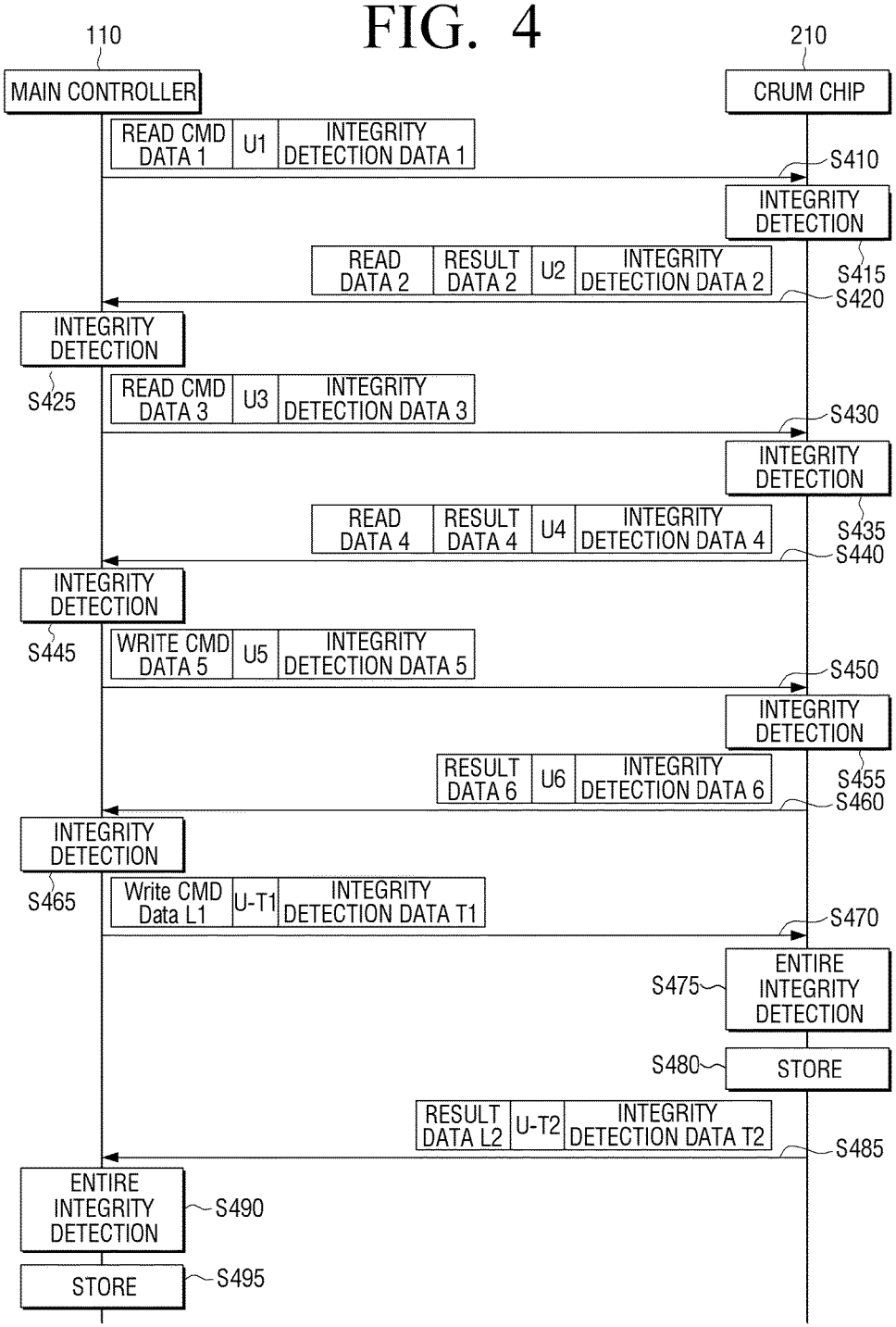
FIG. 4 is a timing view illustrating a communication process between a controller and a CRUM chip in an image forming device according to an exemplary embodiment.

FIG. 4 illustrates an exemplary embodiment of a process of detecting integrity using signals having different formats, for example, different from those of FIG. 2. According to FIG. 4, the controller 110 transmits a signal which includes data and integrity detection data 1 (S410). Herein, the data includes a Read Command (CMD) data 1 and an indicator U1. The Read Command (CMD) data 1 includes not only a command but also a read target or a memory address. The U1 refers to indicator information which follows the Read Command (CMD) data 1. The indicator information U1 refers to a symbol for notifying a location of parsing of the integrity detection data in the signal. The indicator information may be expressed as fixed number of bites. For example, five bytes may be used for the indicator information. On the other hand, the Read Command (CMD) data 1 is variable according to the contents of the data, and thus the size of the integrity detection data 1 is also variable.

When the signal is received, the CRUM chip 210 performs integrity detection using the integrity detection data 1 included in the signal (S415). The CRUM chip 210 is capable of generating integrity detection data 2 using the data to be transmitted and the integrity detection data 1, and transmits the signal which includes these (S420). As illustrated in FIG. 4, in the signal to be transmitted, a Read data 1 which is data read from the memory provided in the consumable unit 100 according to the Read Command (CMD) data 1, a Result data 2 which indicates the result of operation performed according to the Read Command (CMD) data 1, an indicator U2, and an integrity detection data 2 are included.

The controller 110 separates the integrity detection data 2 from the received signal and performs integrity detection (S425). Then, if there exists a subsequent Read Command (CMD) data 3, the controller 110 generates an integrity detection data 3 using the Read Command (CMD) data 3 and the integrity detection data 2, and then transmits a signal which includes the Read Command (CMD) data 3, an indicator U3, and an integrity detection data 3 to the CRUM chip 210 (S430).

As illustrated in FIG. 4, for example, communications using a plurality of integrity detection data 4, 5, 6, T1, and T2 are performed (S440, S450, S460, S470, S485), followed by integrity detections accordingly (S435, W445, S455, S465). When the final communication signal is received from the CRUM chip 210 (S470), the CRUM chip 210 detects integrity of the data which have been transmitted and received in the entire communication process and temporarily stored using integrity detection data T1 included in the final communication signal (S475). If it is determined that the data is integral as a result of the final detection, the data which has been temporarily stored is stored in a non-volatile memory (not illustrated) (S480). Likewise, when the final communication signal is transmitted from the CRUM chip 210, the controller 110 also performs the entire integrity detection using the integrity detection data T2 included in the final communication signal (S490). Accordingly, the data which has been temporarily stored is stored in the non-volatile memory, if it is determined that the data is integral (S495).

The integrity detection data used in such communication processes is generated by accumulating integrity detection data used in the previous communications. That is, as described above, by using the previous integrity detection data and data to be transmitted, new integrity detection data can be generated, and the generated integrity detection data can be transmitted along with data to be transmitted.

According to an exemplary embodiment, the integrity detection data may be processed as follows:

Integrity detection data $1=E$(Read CMD Data $1|U1$)

Integrity detection data $2=E$(Read CMD Data $2|$Result Data $2|U2|$Integrity detection data 1)

Integrity detection data $3=E$(Read CMD Data $3|U3|$Integrity detection data 2)

Integrity detection data $4=E$(Read CMD Data $4|$Result Data $4|U4|$Integrity detection data 3)

Integrity detection data $5=E$(Write CMD Data $5|U5|$Integrity detection data 4)

Integrity detection data $6=E$(Read Data $6|U6|$Integrity detection data 5)

Integrity detection data $T1=E$(Write CMD Data $L1|U-T1|$Integrity detection data $T1$-1)

Integrity detection data $T2=E$(Result Data $L2|U-T2|$Integrity detection data $T1$)

In the aforementioned formulas, the term "E( )" indicates a function of applying a predetermined formula to obtain a result value. As such, integrity detection data may be generated from adding the previous integrity detection data and the entire data to be transmitted, applying various logical operation such as XOR (eXclusive OR), from resulting value of substituting data into other known formulas between the controller 110 and the CRUM chip 210, and from resulting value of encryptions by applying various aforementioned various encryption algorithms. According to the above-described mathematical formula, it can be known that the entire previous integrity detection data is used to generate new integrity detection data.

Figure 5:
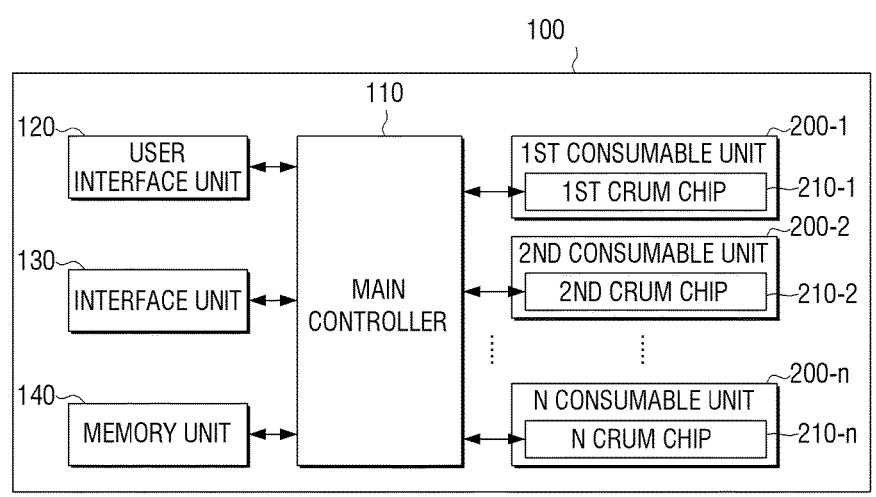
FIG. 5 is a block diagram illustrating an exemplary image forming device mounted on a consumable unit.

FIG. 5 illustrates an exemplary image forming device where a plurality of consumable units 200-1, 200-2, . . . , 200-*n* are provided within the body 500 according to an exemplary embodiment of the present disclosure.

As illustrated in FIG. 5, an image forming device includes a controller 510, a user interface unit 120, an interface unit 130, a memory unit 140, and a plurality of consumable units 200-1, 200-2, . . . , 200-*n*.

The user interface unit 120 performs a role of receiving various commands from the user, or showing and notifying various information. The user interface unit 120 may include an LCD or LED display, at least one button, or a speaker. It may also include a touch screen depending on circumstances.

The interface unit 130 refers to a configuration which may be connected with a wired connection and/or wirelessly with a host PC or various external devices to perform communication. The interface unit 130 may include various types of interfaces such as a local interface, USB (Universal Serial BUS) interface, and a wireless network interface.

The memory unit 140 performs a role of storing various programs or data necessary for driving the image forming device.

The controller 510 performs a role of controlling the entire operations of the image forming device. The controller 510 processes data received through the interface unit 130, and converts the processed data into a format in which image can be formed.

The controller 510 performs an image forming job on the converted data using a plurality of consumable units 200-1, 200-2, . . . , 200-*n*. The consumable unit may be provided in various ways depending on the type of the image forming device.

In the case of a laser printer, electrification units, light exposure units, developing units, transfer units, settlement units, various types of rollers, belts, and OPC drums can be consumable units.

In each consumable unit 200-1, 200-2, . . . , 200-*n*, a first CRUM chip to n CRUM chip 210-1, 210-2, . . . , 210-*n* may be included.

Each CRUM chip may include a memory and CPU etc. At least one of a crypto module, tamper detector, interface unit, clock unit (not illustrated) which outputs clock signals, or random value generating unit (not illustrated) which generates a random value for authentication may be included.

The crypto unit (not illustrated) supports the encryption algorithm so that the CPU (not illustrated) can perform authentication or encrypted communication with the controller 510. The crypto unit may support a determined algorithm among a plurality of encryption algorithms such as RSA, ECC asymmetric key algorithm and ARIA, TDES, SEED, and AES symmetric key algorithm. The controller 510 may also support a corresponding algorithm among a plurality of encryption algorithms. Accordingly, the controller 510 may identify what kind of encryption algorithm is used in the consumable unit 200, proceed with the encryption algorithm, and perform encryption communication.

Consequently, even when a key is issued, regardless of the kind of encryption algorithm applied to the consumable unit 200, the key may be easily mounted on the body 100 and perform encryption communication.

A tamper detector (not illustrated) is a unit for defending various physical hacking attempts, that is, tampering. A tamper detector monitors an operation environment such as voltage, temperature, pressure, light, and frequency, and when there is an attempt such as decap, either erases or physically blocks data. In this case, the tamper detector may have a separate power.

The memory provided inside the CRUM chip 210 may include an O/S memory, non-volatile memory, or volatile memory. The O/S memory (not illustrated) may store the O/S for driving the consumable unit 200. The non-volatile memory (not illustrated) may store various data non-volatility. In the non-volatile memory, various information such as electronic signature information, various encryption algorithm information, information on the state of the consumable unit 200 (for instance, the remaining toner volume, when to exchange the toner, the remaining number of printing sheets etc.), unique information (for instance, manufacturer information, manufacturing date information, serial number, model name of the product etc.), and A/S information may be stored. Data received in the process of communication with the controller may be stored in the non-volatile memory.

The volatile memory (not illustrated) may be used as a temporary storage space needed for operation. In the volatile memory, the data determined to be integral in every communication and the integrity detection data used in each determination may be temporarily stored.

The interface unit (not illustrated) takes a role of connecting the CPU with the controller and may be embodied as a serial interface or a wireless interface. Since the serial interface uses a smaller number of signals than a parallel interface, it has a cost saving effect, and further, it is appropriate in operation environments where there is much noise such as in a printer.

A CRUM chip may be provided in each consumable unit. Each CRUM chip may perform communication with the controller and other CRUM chips. During communication, a new integrity detection data generated by accumulating the integrity detection data used in the previous communication is transmitted.

Figure 6:
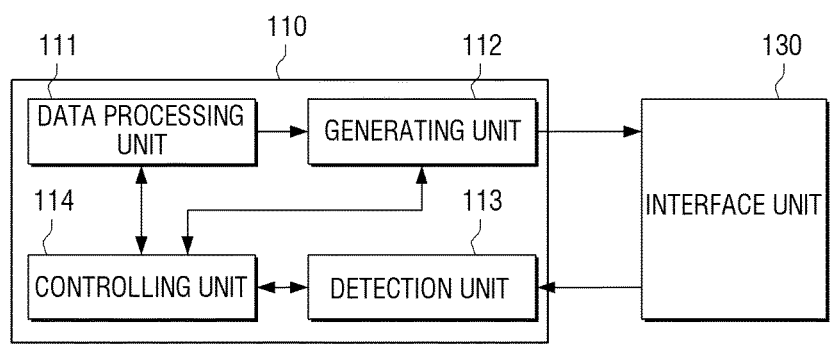
FIGS. 6 and 7 an exemplary image forming device according to various exemplary embodiments.

FIG. 6 illustrates an image forming device according to an exemplary embodiment of the present invention. As illustrated in FIG. 6, for example, an image forming device includes a controller 610 and an interface unit 630, and the controller 610 includes a data processing unit 111, a generating unit 112, a detection unit 113, and a controlling unit 114.

The data processing unit 111 generates data to be transmitted to the CRUM chip mounted on the consumable unit which can be mounted on the image forming device. The data includes at least one of a command and information to be processed by that command. That is, in the case of a read command, an address of a memory to be read or information on the subject to be read may be transmitted together. In the case of a writing command, information to be recorded may be transmitted together. The data processing unit 111 may output data as it is or may encrypt the data and then output it. Various commands such as a command for authentication and information related to those commands may be generated in the data processing unit 111. These commands and information may be generated frequently prior to, during, or after performing the image forming job. For instance, when the image forming device is turned on or when the consumable unit 200 is detached and then attached again, or when an initialization command on the image forming job is input, the controller 110 may transmit the authentication command or the read command for authentication on the consumable unit 200. Accordingly, the controller 610 may identify various information being managed in the consumable unit 200 itself, or may store it in the memory unit 140 of the body of the image forming device 100.

During or after completion of performing the image forming job, the data processing unit 111 may generate a writing command and corresponding information to record information regarding the consumed item, that is, information about the ink or toner, the number of printed pages, the number of printed dots, and history information about the user who performed printing, to the consumable unit 200.

The generating unit 112 generates integrity detection data using data output from the data processing unit 111. The generating unit 112 may simply add up the data output from the data processing unit 111, perform a logical operation such as XOR, substitute to a predetermined mathematical formula, or encrypt the data using the encryption algorithm, and output the result value as integrity detection data. If there is integrity detection data used in the previous communication, the generating unit 112 accumulates and reflects even that previous integrity detection data together, and generates the integrity detection data.

The integrity detection data generated in the generating unit 112 is added to the data generated in the data processing unit 111 and is transmitted to the interface unit 630. In FIG. 6, it is illustrated as if output of the data processing unit 111 is only provided to the generating unit 112, but the output of the data processing unit 111 may be provided directly to the interface unit 630 or provided to a multiplexer (not illustrated). In the case where a multiplexer is provided, output of the generating unit 112 is also provided as to the multiplexer, and may be transmitted to the interface unit 630 in a signal form where data and integrity detection data is included together.

The interface unit 630 transmits the signal which includes the data and the first integrity detection data to the CRUM chip 210.

The interface unit 630 may receive a response signal from the CRUM chip 210. For the convenience of explanation, the signal transmitted from the interface unit will be referred to as a first signal, and the signal transmitted from the CRUM chip will be referred to as a second signal.

A second integrity detection data included in the second signal is data where the first integrity detection data has been accumulated and reflected. As described above, accumulative reflecting means that the entire integrity detection data which is previously transmitted and received is used for generating new integrity detection data. The detection unit 113 separates the second integrity detection data included in the second signal received through the interface unit 630, and detects integrity of the data included in the second signal. More specifically, the detection unit 113 applies a known method between the CRUM chip 210 regarding the remaining data after separation of the second integrity detection data and the integrity detection data that the controller 610 transmitted previously, and generates integrity detection data.

The detection unit 113 compares the integrity detection data generated accordingly with the second integrity detection data separated from the second signal, and determines whether they are identical. If they are identical, the detection unit 113 determines that the corresponding data is integral, and if they are not identical, the detection unit 113 determines that the corresponding data is in an error state.

The controlling unit 114 performs a subsequent communication according to the detection result by the detection unit 114. That is, if it is determined that the second signal includes data in an error state, the controlling unit 114 may stop the subsequent communication or make another attempt. If it is determined that the second signal is in a normal state, that is, in an integral state, the controlling unit 114 performs the subsequent communication.

According to an exemplary embodiment, upon determining that the corresponding data is in an integral state, the controlling unit 114 may store the corresponding data directly to the memory unit 140.

According to an exemplary embodiment, the controlling unit 114 may temporarily store the data obtained at every communication and the integrity detection data, and once the final communication is complete, record the temporarily stored data in the memory unit 140.

Figure 7:
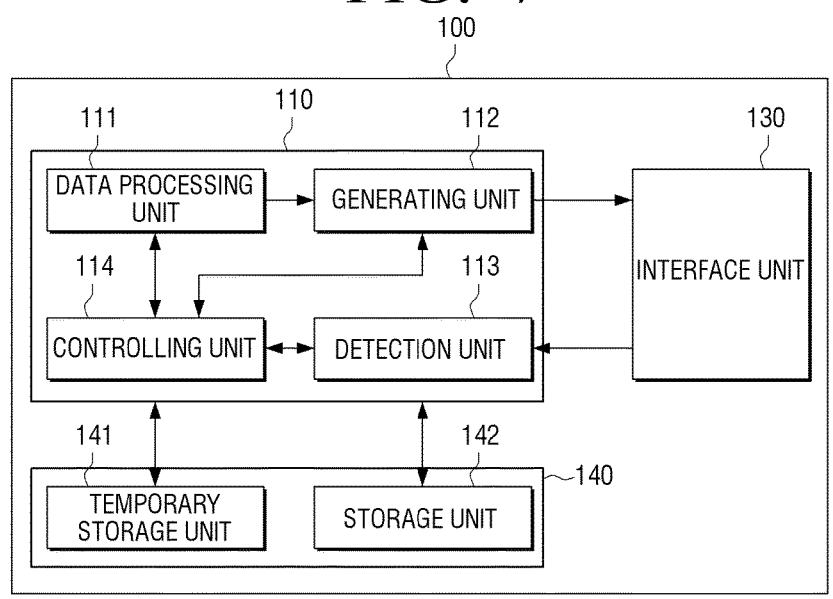

FIG. 7 illustrates an image forming device according to an exemplary embodiment. As illustrated in FIG. 7, the body 700 includes the memory unit 740 besides the controller 710 which includes the data processing unit 711, the generating unit 712, and the detection unit 713, and the controlling unit 714, and the interface unit 730. The memory unit 740 includes a temporary storage unit 741 and a storage unit 742.

Accordingly, in the temporary storage unit 741, the data determined to be integral and the integrity detection data may be temporarily stored. The integrity detection data temporarily stored may be used during integrity detection in the subsequent communication process.

That is, when the second signal regarding the first signal is transmitted after the first signal which includes the first integrity detection data is transmitted to the CRUM chip 210, the detection unit 713 separates the second integrity detection data from the second signal, and generates a new integrity detection data, that is, data subject to comparison, using the remaining data and the integrity detection data stored in the temporary storage unit 741. Thereafter, the detection unit 713 compares the newly generated integrity detection data with the second integrity detection data in the temporary storage unit 741, and may determine integrity of second signal or the data included in the second signal.

The generating unit 712 may generate, for example, a third integrity detection data based on the subsequent data and the second integrity detection data, if there exists a subsequent data to be transmitted to the CRUM chip 210 in the state the second signal is integral. Accordingly, the interface unit 730 transmits the third integrity detection data and the third signal which includes the subsequent data to the CRUM chip 210. That is, as illustrated in FIGS. 2 to 4, the controller and the CRUM chip perform communication numerous times.

The detection unit 713 may perform a final detection on the integrity of the entire signals received during communication, using the final integrity detection data included in the signal received in the process of communication. That is, as aforementioned, the integrity detection data transmitted and received during communication is generated by using at least one part of the previous integrity detection data, and thus the final integrity detection data includes all data from the very first integrity detection data to that right before the current one. Therefore, if it is determined that the data is integral, using the final integrity detection data, all data temporarily stored is stored in the storage unit 742 in the memory unit 740 when communication necessitating recording is performed, based on the judgment that all communication contents is reliable.

During the first communication, the controller 710 and the CRUM chip 210 include an indicator which notifies that it is the first communication, and then transmit the signal, and during the final communication, include an indicator which notifies that it is the final communication, and then transmit the signal. Accordingly, when it is determined from the signal received from the counterpart, the controller 710 and the CRUM chip 210 performs the aforementioned final detection, and stores the data to the storage unit 742.

Such final detection can be performed when one image forming job is complete, or in every unit of time period predetermined according to exemplary embodiments. It can also be performed when a user command for data storage is input, when a turn-off command regarding the image forming device is input, or in the process of authenticating an image forming device and a consumable unit.

FIGS. 6 and 7 illustrate an exemplary data processing unit, generating unit, detection unit, and the controlling unit are included in the controller, but it is not necessarily limited to such embodiment. That is, at least one of the data processing unit, generating unit, detection unit, and controlling unit may be provided apart from the controller. In this case, unlike as illustrated in FIGS. 1 to 4, the controller may perform only the original function, and communication with the CRUM chip 210 may be performed by the data processing unit, generating unit, detection unit, and the controlling unit.

Figure 8:
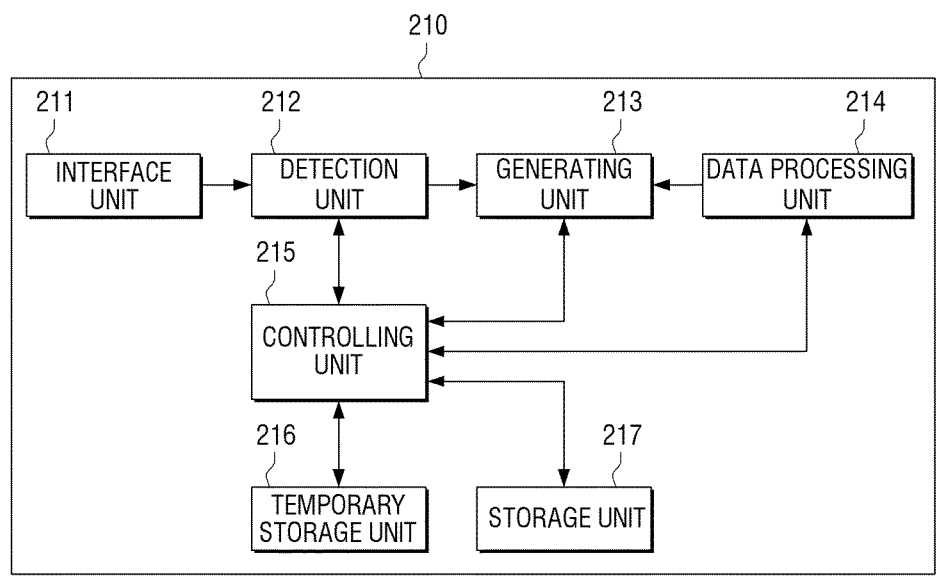
FIG. 8 illustrates a configuration of a CRUM chip according to an exemplary embodiment of the present disclosure.

FIG. 8 illustrates a configuration of a CRUM chip 810 according to an exemplary embodiment of the present disclosure. As illustrated in FIG. 8, the CRUM chip 810 includes an interface unit 811, detection unit 812, generating unit 2813, data processing unit 814, controlling unit 815, temporary storage unit 816, and storage unit 817.

The interface unit 811 receives the first signal which includes the first data and the first integrity detection data from the body of the image forming device, especially the controller mounted on the body.

The detection unit 812 separates the first integrity detection data from the first signal, and detects the integrity of the first signal. The detection method of the detection unit 812 is similar to that illustrated above, and thus repeated explanation will be omitted.

The temporary storage unit 816 temporarily stores the first data and the first integrity detection data, when it is determined that the first signal is integral.

The data processing unit 814 generates the second data when there exists a second data which has to be transmitted to the body of the image forming device.

The generating unit 813 generates the second integrity detection data using the generated second data and the first integrity detection data.

The controlling unit 815 controls the interface unit to transmit the second signal which includes the second data and the second integrity detection data to the body of the image forming device. Besides, the controlling unit 815 controls the entire operations of the CRUM chip. That is, as aforementioned, when the CRUM chip itself has the O/S, the controlling unit 815 may drive the CRUM chip using the O/S. Upon the initialization program being stored, the initialization may be performed separately from the body of the image forming device.

The controlling unit 815 performs an operation corresponding to each command received from the body of the image forming device. That is, when the read command is received, the controlling unit 815 reads the data stored in the storage unit 817 according to that command, and transmits the data to the image forming device through the interface unit 811. In this process, integrity detection data may be added.

Meanwhile, the detection unit 812 performs integrity detection on the third signal when the third signal which includes the third integrity detection data generated by using the second integrity detection data.

When the communication is completed, the detection unit 812 detects the entire signals received in the process of performing the image forming job, using the final integrity detection data included in the signal received in the process of the communication. When the communication is completed in the integrity state, the temporary storage unit 816 stores the data which has been temporarily stored in the storage unit 817, if necessary.

That is, when communication is completed, the controlling unit 815 controls the detection unit 812 to perform the final detection using the final integrity detection data. Accordingly, when it is determined that the corresponding data is integral as a result of the final detection in the detection unit 812, the controlling unit 815 stores the data which has been temporarily stored in the temporary storage unit 816 in the storage unit 817, if necessary.

Operations of the CRUM chip 810 in FIG. 8 are similar to the operations of the image forming device in FIG. 7. That is, the controller of the image forming device and the CRUM chip of the consumable unit perform operations that similarly correspond to each other, as illustrated in FIGS. 1 to 4. Therefore, both sides should generate the integrity detection data, and should have algorithms which perform detections using the generated integrity detection data.

Figure 9:
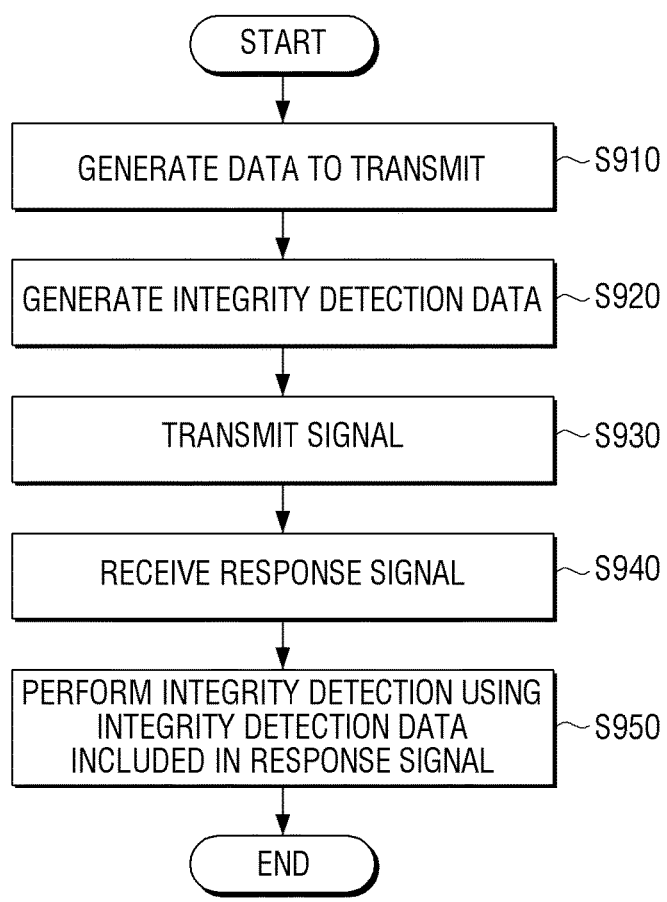
FIGS. 9 and 10 illustrate a communication method according to various exemplary embodiments.

FIG. 9 illustrates a communication method according to an exemplary embodiment of the present disclosure. The communication method illustrated in FIG. 9 may be performed in a controller provided in a body of an image forming device, or in a CRUM chip provided in a consumable unit.

As illustrated in FIG. 9, when data to be transmitted is generated (S910), integrity detection data is generated using that generated data (S920).

Thereafter, the generated integrity detection data and the signal which includes the data are transmitted (S930).

Accordingly, a response signal corresponding to the transmitted signal is received from the counterpart (S940). In the response signal, a new integrity detection data generated by using the integrity detection data transmitted from the S930 is included.

The integrity detection is performed using the integrity detection data included in the response signal (S950).

Thus, according to an exemplary embodiment, it is possible to determine integrity of every communication using the previous integrity detection data accumulatively According to a value of the previous integrity detection data, a value of new integrity detection data may vary. As the method of accumulatively reflecting is explained in the detailed description above, repeated explanation will be omitted.

Figure 10:
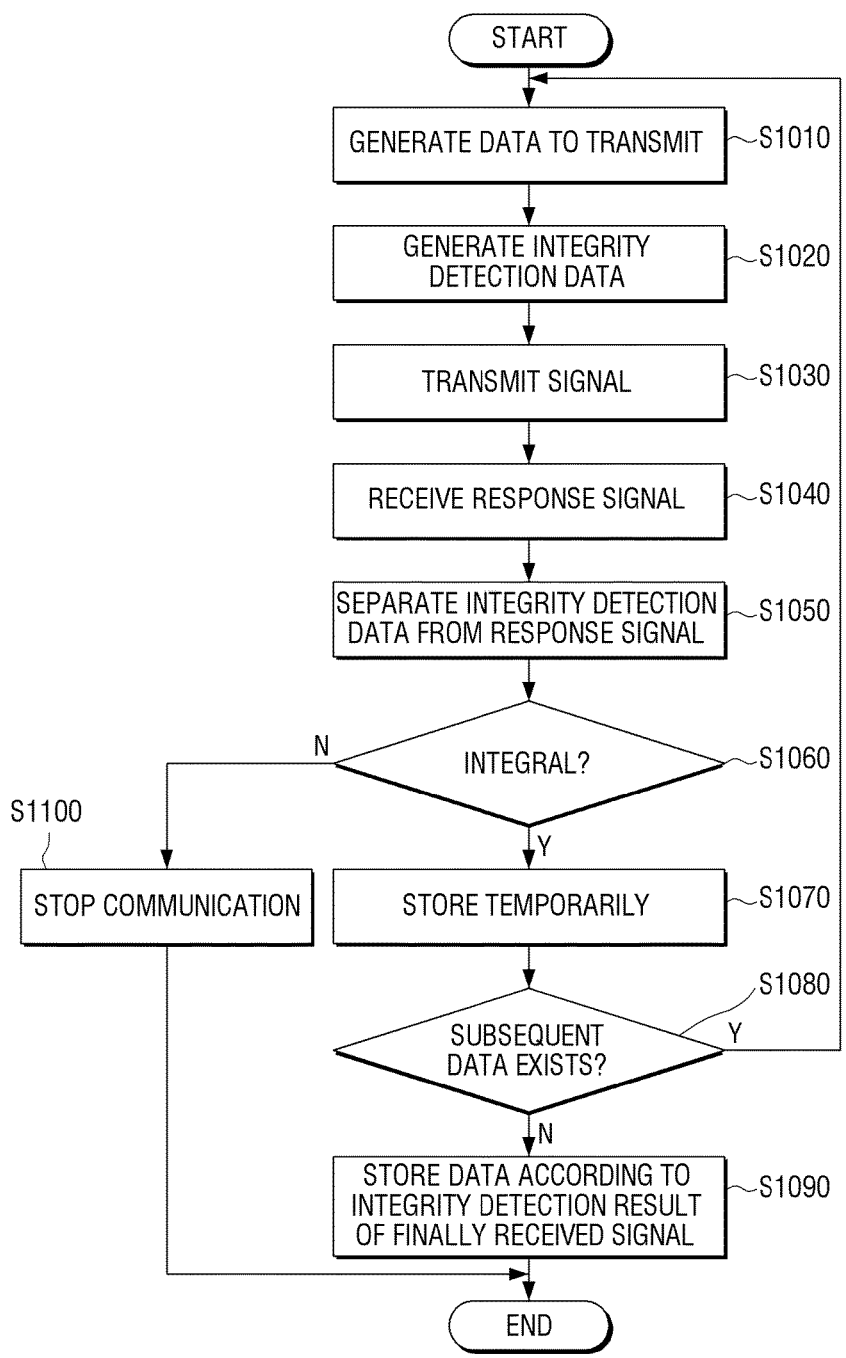

FIG. 10 illustrates a communication method according to a an exemplary embodiment. As illustrated in FIG. 10, when data to be transmitted is generated (S1010), integrity detection data is generated based on that data (S1020). Thereafter, the signal which includes the data and the integrity detection data is transmitted (S1030), and a response signal regarding that signal is received (S1040). Accordingly, the integrity detection data is separated from the response signal (S1050).

Whether the data is integral may be determined using the remaining data from which the integrity detection data has been separated, and the existing integrity detection data (S1060).

If it is determined that the data is integral as a result of the determination, the data is temporarily stored (S1070), whereas if it is determined that the data is in an error state, the communication is stopped (S1100) or another attempt may be performed.

If there exists subsequent data in the temporarily stored state (S1080), the aforementioned stage may be repeatedly performed. If there is no subsequent data, the temporarily stored data is stored according to the integrity detection result of the received signal (S1090).

In the aforementioned exemplary embodiments, except from the integrity detection data transmitted from the controller of the image forming device during the first initialization of the data communication, the integrity detection data is generated by using the integrity detection data during the previous communication. As a result, the integrity detection data during the final communication includes all integrity detection data used in some, e.g., important communication processes. Therefore, an exact data can be recorded.

Thus, it is possible to safely protect the information on the controller and the CRUM chip from external effects such as noise, poor contact point, abnormal changes in consumables, intentional modification, and hacking.

According to an exemplary embodiment may be based on the image forming device and the CRUM chip mounted on the consumable unit used in the image forming device, but the aforementioned communication method may be applied to other types of devices as well. For instance, an exemplary embodiment includes may be applied to the case of communication between a device manufactured for communication with the CRUM chip and not the image forming device, and also to the case of communication between a normal electronic device and a memory mounted on a component used in that device.

The integrity detection data may be used, for example, for only some processes of the authentication. That is, a main controller provided in the main body of an image forming device may perform authentication with the CRUM chip of a consumable unit in various events, such as when a consumable unit where a CRUM chip is mounted is replaced, when an image forming device is booted, when data update is required, when a predetermined time period arrives, and the like.

The CRUM chip may be designed to perform authentication with an image forming apparatus, and perform operations such as reading or writing data from the CRUM chip only when it is confirmed that the CRUM chip is suitable for the corresponding image forming apparatus. There may be various types of authentication that can be selected depending on circumstances. For example, in a case where the information of the previous CRUM chip cannot be used due to booting or replacement of a consumable unit, an authentication method that has high-level of encryption, but takes a relatively longer time to be performed may be used. In a case where authentication is required for updating some of the data in the process of printing, a faster and simpler authentication may be performed. Although the authentication performed in the process of printing is relatively simple, it is a strong method of authentication in terms of encryption since it is based on data generated during the previous authentication with high-level of encryption.

Figure 11:
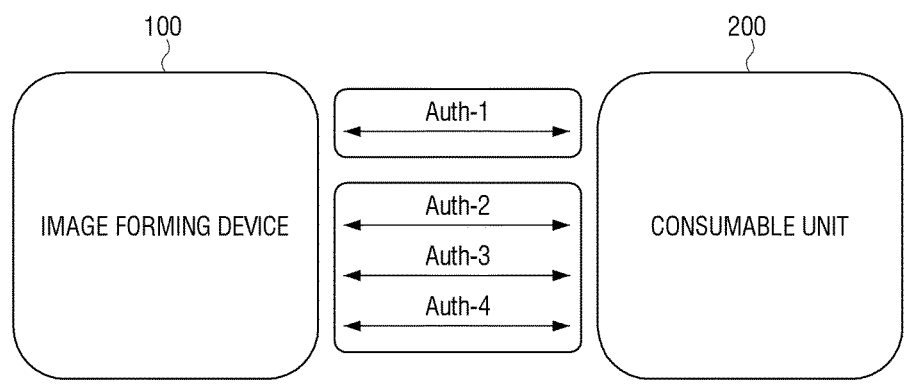
FIGS. 11 to 18 are views illustrating an authentication method of an image forming device according to an exemplary embodiment.

FIG. 11 illustrates an exemplary authentication process between a main body of an image forming device and a CRUM chip mounted on a consumable unit. Referring to FIG. 11, the main body 100 of an image forming device and the CRUM chip 210 perform final authentication after going through multiple authentication processes (Auth-1~4). The number and order of the authentication process (Auth-1~4) may vary in various exemplary embodiments. The main body 100 of an image forming device and the CRUM chip 210 may perform the authentication process for generating a session key and the authentication process for verifying compatibility of a CRUM chip, and one or more authentication processes may be performed before, after, or between the authentication processes.

As illustrated in FIG. 11, the authentication may be divided into a basic authentication and an additional authentication. The basic authentication includes the first authentication process (Auth-1) for performing internal authentication, and the additional authentication includes multiple operations such as Auth-2, Auth-3, and Auth-4.

The first authentication process (Auth-1) performs authentication between the image forming device 100 and the CRUM chip 210, and performs an operation to create a common session key. The image forming device 100 and the CRUM chip 210 communicate with each other by encrypting all, or part, of the data that is exchanged between them during communication using an encryption algorithm such as a symmetric key or an asymmetric key so that the data cannot be seen from outside.

The image forming device 100 and the CRUM chip 210 create a common session key using data exchanged during the first authentication process (Auth-1) and use the session key to encrypt data for the subsequent communication.

The second authentication process (Auth-2) refers to an operation to synchronize the Combination Table (C-table) of the image forming device 100 with that of the CRUM chip 210. The C-table is information that is used for the image forming device 100 and the CRUM chip 210 to authenticate each other. That is, the C-table refers to a table where a value to be operated when sending a query code is recorded, and may also be referred to as the first table.

When booting is performed in the image forming device 100, or when it is determined that the C-table of the image forming device 100 is not consistent with the C-table of the CRUM chip 210, the second authentication process may be performed to synchronize the C-tables of the image forming device 100 and the CRUM chip 210. Whether the C-table of the image forming device 100 is consistent with the C-table of the CRUM chip 210 may be determined in the image forming device 100.

Figure 12:
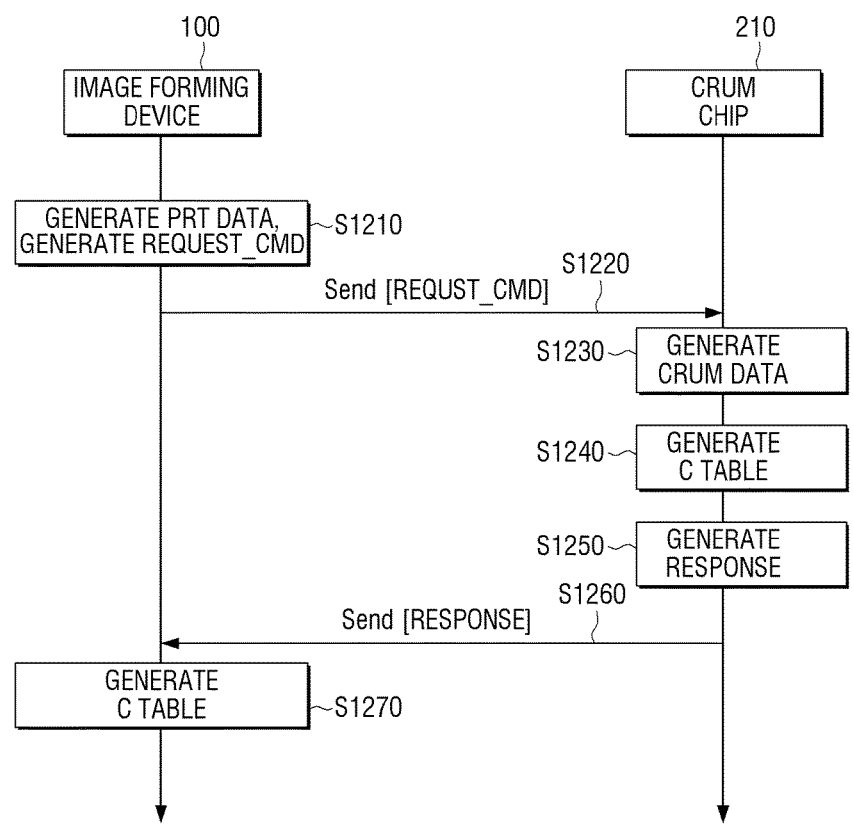

FIG. 12 is a timing view to illustrate an exemplary second authentication process. As illustrated in FIG. 12, the image forming device 100 may generate PRT data and a REQEST_CMD (request command) (S1110), and transmit the same to the CRUM chip 210. The REQUEST_CMD may be provided in various formats. For example, the REQUEST_CMD may be CMD||E(PRT data) ||MAC||CRC (Cyclic Redundancy Check) or EDC (Error Detection and Correction bits). "E( )" represents a Cryptography Algorithm, and "||" represents a predetermined operation symbol, that is, an addition symbol.

When the REQUEST_CMD is received, the CRUM chip 210 generates CRUM data (S1230), and generates a C-table using the generated CRUM data and the received PRT data (S1240). The CRUM chip 210 may generate a C-table by applying a predetermined configuring function with respect to the CRUM data and the PRT data.

The CRUM chip 210 may generate a RESPONSE including the generated CRUM data (S1250), and transmit the generated RESPONSE to the image forming device 100 (S1260). The RESPONSE may be generated using the methods of E(CRUM data) ||MAC||CMD Result||CRC or EDC.

The image forming device 100 generates a C-table using the received CRUM data and the PRT data (S1270). The image forming device 100 may also generate a C-table by applying a predetermined configuring function. Consequently, the image forming device 100 and the CRUM chip 210 may have the same C-table, respectively.

When the second authentication process (Auth-2) is completed, the third authentication process (Auth-3) may be performed. The third authentication process (Auth-3) may be a process where the image forming device 100 and the CRUM chip 210 synchronize the Query table (Q-table). The Q-table refers to a table where data for authentication such as a query code is recorded, and may be also referred to as the second table.

Figure 13:
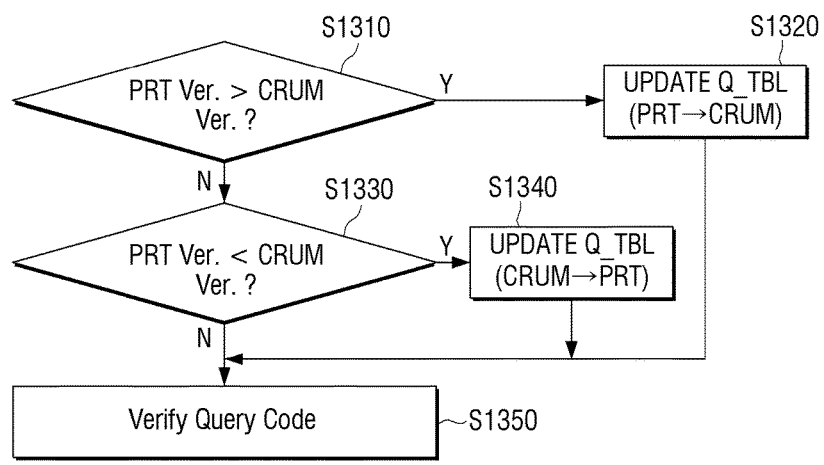

FIG. 13 illustrates an exemplary third authentication process. As illustrated in FIG. 13, when the second authentication process is completed, the main body of the image forming device 100 determines whether the version of the Q-table in the main body (that is, PRT ver.) is larger than the version of the Q-table in the CRUM chip 210 (S1310). If it is determined that the PRT version is larger than the CRUM version, the main body of the image forming device 100 provides information regarding the Q-table to the CRUM chip 210. Accordingly, the CRUM chip 210 updates the CRUM version to match the Q-table version of the main body of the image forming device (S1320).

On the other hand, if the PRT version is smaller than the CRUM version (S1330), the CRUM chip 210 provides information regarding the Q-table to the main body of the image forming device 100. Accordingly the image forming device 100 updates the PRT version to match the Q-table version of the CRUM chip 210 (S1340).

As such, when Q-tables of both sides have become consistent through updating, or if they are consistent without updating, the operation of checking a query code, that is, the values recorded in the Q-table is performed (S1350). Such an operation of checking a query code may be the fourth authentication process.

Figure 14:
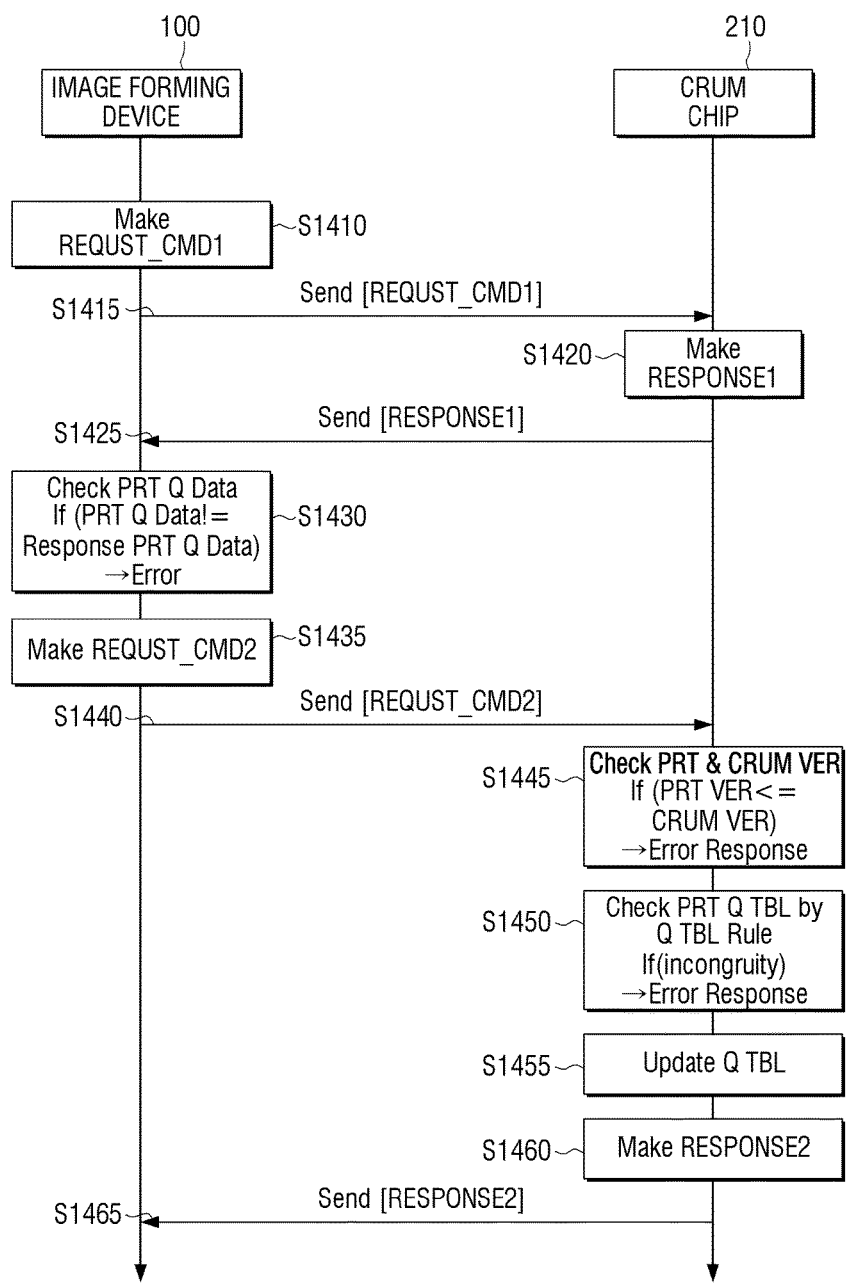

FIG. 14 illustrates an exemplary process of synchronizing a Q-table with the Q-table of the main body of an image forming apparatus. As illustrated in FIG. 14, the image forming device 100 generates REQUEST_CMD1 to request CRUM data (S1410), and transmits the REQUEST_CMD1 to the CRUM chip 210 (S1415). The CRUM chip 210 generates RESPONSE 1 in response to the REQUEST_CMD1 (S1420), and transmits the RESPONSE 1 to the image forming device 100 (S1425). The RESPONSE 1 may be generated using the methods of E1(E2(PRT Q DATA Index)||CRUM Data) ||MAC||CMD1 Result||CRC or EDC. Herein, E1 refers to an encryption algorithm, and E2 (PRT Q DATA Index) may be defined as obtaining Q data by applying a Q-table index to a Q-table and encrypting the Q data using an arbitrary first encryption algorithm.

When the RESPONSE 1 is received, the image forming device 100 compares the received Q-data (S1430). That is, the image forming device 100 detects Q-data corresponding to the index which has been transmitted to the CRUM chip 210 from the stored Q-table and compares the Q-data with the Q-data transmitted from the CRUM chip 210 to determine whether they are consistent with each other. If it is determined that they are not consistent, the image forming device 100 generates REQUEST_CMD2 (S1435), and transmits the REQUEST_CMD2 to the CRUM chip 210 (S1440). The REQUEST_CMD2 may be generated using the methods of E1(E5(PRT Q TBL)||MAC||CRC or EDC. Herein, E5 refers to the second encryption algorithm that is different from E1 and E2.

When the REQUEST_CMD2 is received, the CRUM chip 210 compares the Q-table version of the image forming device with the Q-table version of the CRUM chip 210, and if it is determined that they are not consistent (S1445) or a rule which is different from that of the Q-table of the CRUM chip 210 is applied (S1450), an error response is generated. Accordingly, the CRUM chip 210 updates its Q-table to match with the PRT Q-table (S1455), generates RESPONSE 2 (S1460), and transmits the RESPONSE 2 to the image forming device 100 (S1465). The RESPONSE 2 may be generated using the methods of CMD2 Result||CRC or EDC.

Figure 15:
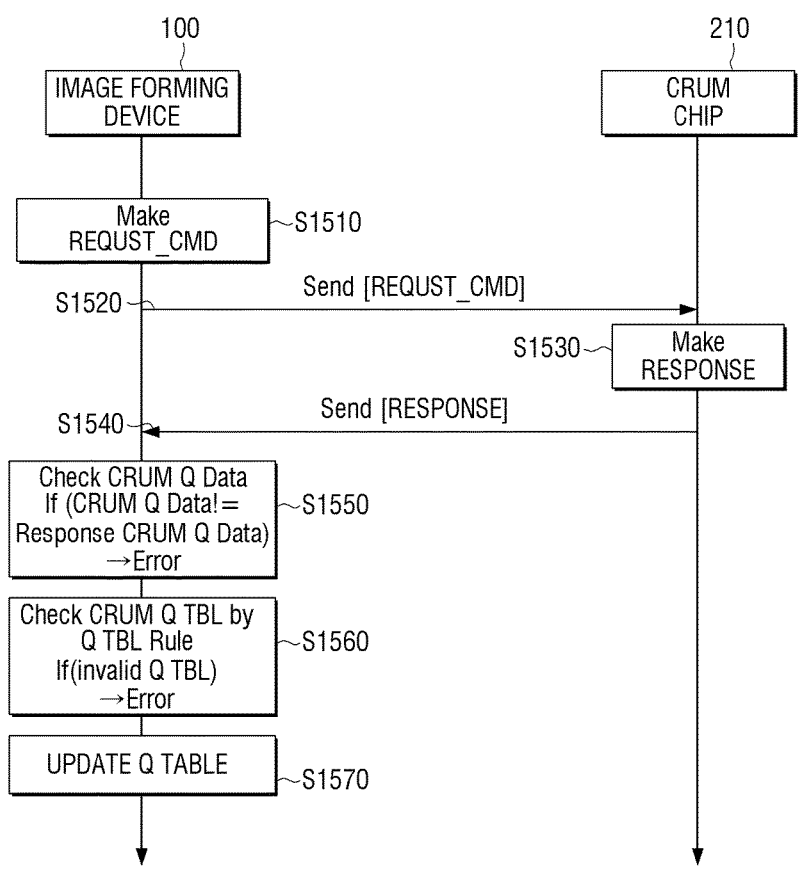

FIG. 15 is a timing view illustrating an exemplary process of synchronizing a Q-table with the Q-table of the CRUM chip 210. As illustrated in FIG. 15, the image forming device 100 generates REQUEST_CMD (S1510), and transmits the REQUEST_CMD to the CRUM chip 210 (S1520). The CRUM chip 210 generates a RESPONSE according to a received command (S1530), and transmits the RESPONSE to the image forming device 100 (S1540). The RESPONSE may be generated by using the methods of E1(E2(CRUM Q DATA)||E5(CRUM Q TBL))||MAC||CMD Result||CRC or EDC. When the RESPONSE is received, the image forming device 100 checks CRUM Q DATA of the received RESPONSE, and compares the CRUM Q DATA with the RESPONSE CRUM Q DATA (S1550). If it is determined that they are not consistent with each other, it is determined to be an error state. The image forming device 100 checks whether the received CRUM Q table is in compliance with the rule for Q-table, and if it is determined that the Q-table is not valid, it is determined to be an error state (S1560).

If it is determined that the Q-table is not consistent, the image forming device 100 updates the Q-table in accordance with the received data (S1570). Consequently, the Q-table of both sides are synchronized with each other.

The second and the third authentication processes (Auth-2, Auth-3) are processes to synchronize information of the image forming device 100 and the consumable unit 200 so as to analyze data which is exchanged during the fourth authentication process (Auth-4). If the existing data is already the same, the third authentication process (Auth-3) may not be performed.

The fourth authentication process (Auth-4) is an authentication process to confirm compatibility. In the fourth authentication process, the image forming device 100 and the consumable unit 200 use the session key generated by the first authentication process (Auth-1) and the information shared during the second and the third authentication processes (Auth-2, 3) to confirm whether the consumable unit 200 or the CRUM chip 210 mounted on the consumable unit 200 is an appropriate for the image forming device 100.

Figure 16:
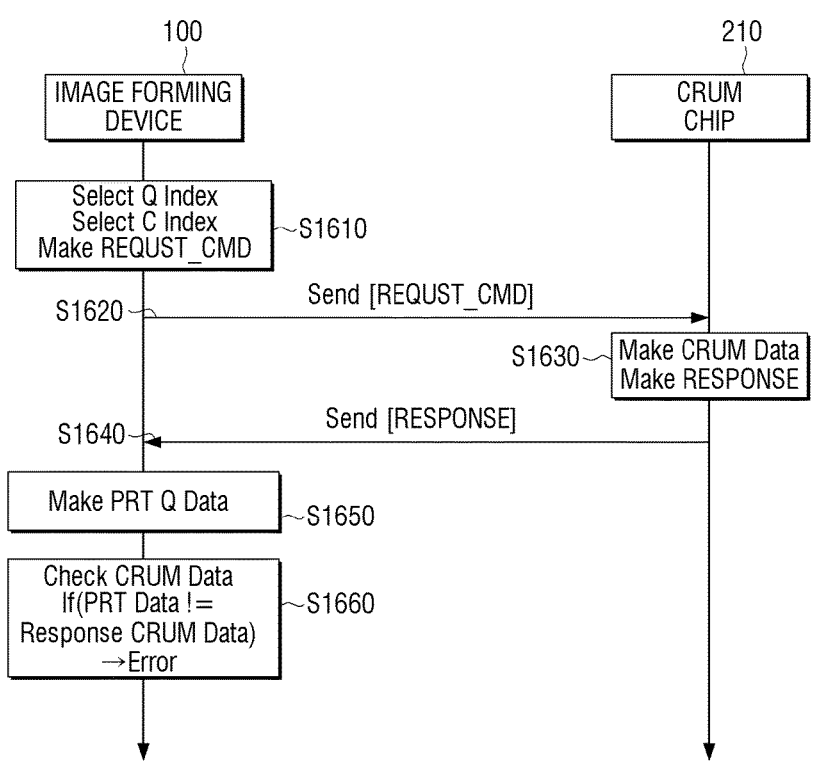

FIG. 16 is a timing view to illustrate an exemplary method for performing the fourth authentication process (Auth-4). As illustrated in FIG. 16, the image forming device 100 selects Q index, C index, etc., generates REQUEST_CMD including the selected indexes (S1610), and transmits the REQUEST_CMD to the CRUM chip 210 (S1620). The CRUM chip 210 generates CRUM data using the received REQUEST_CMD, generates RESPONSE including the same, and transmits the RESPONSE to the image forming device 100 (S1640).

When the RESPONSE is received, the image forming device 100 generates RPT Q data (S1650) and compares the PRT Q data with the CRUM data included in the RESPONSE (S1660). If it is determined that they are consistent with each other, it is determined that t CRUM chip 210 is appropriate and the authentication is completed.

The image forming device 100 and the consumable unit 200 may transmit/receive a signal including integrity detection data during the first authentication process (Auth-1) to create a session key and during the fourth authentication process (Auth-4) to confirm compatibility. The integrity detection data refers to data which is generated by accumulatively reflecting integrity detection data included in the previously-received signals. Therefore, integrity detection data is variable according to the previous integrity detection data. As meaning and the method of accumulative reflecting are explained in the detailed description, repeated explanation will be omitted. If no signal including integrity detection data has been received previously, that is, if integrity detection data needs to be generated for the first time, integrity detection data may be generated using only data to be transmitted.

The communication data exchanged during the second and the third authentication processes (Auth-2, Auth-3) affects the next communication process which is the fourth authentication process (Auth-4). Accordingly, even if integrity detection data is not used in the intermediate authentication process, the fourth authentication process (Auth-4) may be failed when there is a problem in the second and the third authentication processes (Auth-2, Auth-3), thereby resulting in failure in authentication eventually. Therefore, it is not necessary to include integrity detection data in the entire authentication process, and integrity detection data may be included only in Auth-1 and Auth-4 which are important authentication processes. However, this is only an example, and integrity detection data may be transmitted/received at every authentication process or in at least one of the second and the third authentication processes.

According to an exemplary embodiment, authentication may be performed between the main body 100 and the CRUM chip 210, but such an authentication operation may be performed between the main controller 110 mounted in the main body 100 and the CRUM chip 210. An exemplary authentication process between the main controller 110 and the CRUM chip 210 is explained with reference to FIGS. 17 and 18.

Figure 17:
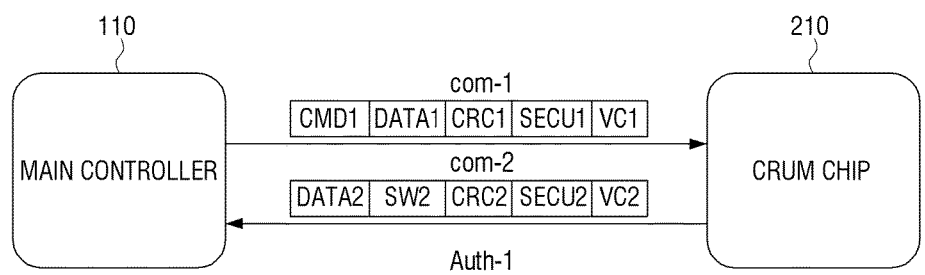

FIG. 17 illustrates an exemplary first authentication process (Auth-1) to generate a session key in the process of a plurality of authentication processes. For convenience of explanation, the authentication process to generate a session key may be defined as the first authentication in the exemplary embodiment, but other authentication processes may be performed prior to the authentication process for generating a session key.

As illustrated in FIG. 17, the first authentication process (Auth-1) may be divided into com-1 and com-2. The process of com-1 is a process for transmitting data so that the main controller 100 may perform an authentication operation using the CRUM chip 210. The signals transmitted during the process of com-1 include CMD1, DATA1, CRC1, symbol, VC1, and so on. CMD1 represents a command, and may include options related to authentication or information regarding the size of data to be transmitted. DATA1 includes random data necessary for authentication, data values related to encryption for authentication, specific information stored in an image forming apparatus, and so on. In the case of the first authentication process, not only the above-mentioned random data (R1), but also data related to a session key such as information regarding a key size, various keys used in an asymmetric key algorithm, etc. and other information stored in the main body of the image forming device 100 may be transmitted to DATA1. According to an exemplary embodiment, some of the above-mentioned information may be omitted or replaced with other information.

The random data may be a value which the main controller 110 generates randomly for authentication. Accordingly, the random data may vary for each authentication, but some times one value that is set temporarily instead of the random data may be transmitted. CRC1 represents an error detection code. CRC1 is transmitted to check errors in CMD1 and DATA1. Other error detection methods such as Checksum or MAC may be used in addition to or in substitution for CRC1.

The symbol in com-1 designates integrity detection data. FIG. 17 illustrates a case where SECU1 is used as a symbol which may identify integrity detection data from other data and display the operation type of integrity data. The SECU1 used in FIG. 17 is a symbol representing the first communication using the integrity detection data function. VC1 is integrity detection data which is generated for the first time. VC1 generates contents consisting of CMD1, DATA1, CRC1, and SECU1 string according to a specific equation. Since VC1 is integrity detection data generated for the first time, VC1 is not generated by accumulatively reflecting integrity detection data received previously but using only the remaining data. Specifically, VC1 can be a result value of a logical operation such as XOR or other logical operations on CMD1, DATA1, CRC1, and SECU1 using an arbitrary mathematical formula. Or, VC1 can be a result value of applying an arbitrary encryption algorithm on CMD1, DATA1, CRC1, and SECU1.

Once the CRUM chip 210 receives com-1, the CRUM chip 210 transmits com-2 which includes DATA2, SW2, CRC2, SECU2, VC2, and so on. If the first authentication process refers to an authentication process for generating a session key, the data of com-2 may include the first random data (R1), the second random data (R2), a chip serial number (CSN), information regarding a key used for an asymmetric key algorithm, part of internal information of CRUM chip, and so on. The first random data (R1) is a value received at com-1, and the second random data (R2) is a value which is generated from the CRUM chip 210. The information included in com-2 may be omitted or replaced with other information.

In addition, SW2 represents result data that shows the result of a job performed in the CRUM chip 210 according to the command of com-1. As CRC2 and SECU2 operate in the same way as CRC1 and SECU1 in com-1, descriptions regarding CRC2 and SECU2 will be omitted. VC2 is integrity detection data which is generated by accumulatively reflecting VC1 which is integrity detection data of com-1. Specifically, VC2 can be a result value of XOR operation or other operations using an arbitrary mathematical formula by using CMD2, DATA2, CRC2, SECU2, which are data to be transmitted, along with VC1. Or, VC2 can be a result value by applying an arbitrary encryption algorithm on VC1, CMD1, DATA1, CRC1, and SECU1. Consequently, as VC1 is related to VC2, VC2 is variable according to a value of VC1.

The CRUM chip 210 may generate VC2 by combining DATA2, SW2, CRC2, and SECU2 that will be transmitted to com-2 with VC1 according to a predetermined method, which will be explained later in greater detail.

If the first authentication process is performed as illustrated in FIG. 17, the first random data (R1) generated by the main controller 110 and the second random data (R2) generated in the CRUM chip 210 may be shared with each other. The main controller 110 and the CRUM chip 210 may generate a session key using R1 and R2, respectively.

As illustrated in FIG. 11, a final authentication is performed after going through a plurality of authentication processes. Out of the processes, the fourth authentication process is to check compatibility of the CRUM chip 210 or the consumable unit 200 mounted in the CRUM chip 210. Between the first authentication and the fourth authentication, at least one more authentication process may be added in order to prepare for the fourth authentication.

Figure 18:
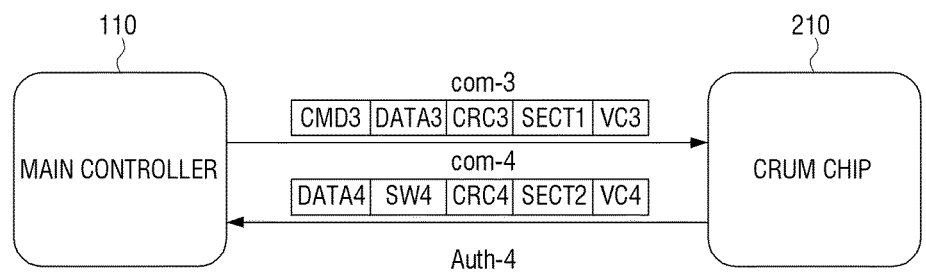

FIG. 18 illustrates an exemplary authentication process to confirm compatibility. In FIG. 11, the authentication process to confirm compatibility that is the fourth authentication is performed for the last time out of a plurality of authentication processes, but the order is not limited thereto.

As illustrated in FIG. 18, the fourth authentication process (Auth-4) comprises com-3 and com-4. Com-3 refers to the process where the main controller 110 transmits a signal to the CRUM chip 210, and com-4 refers to the process where the CRUM chip 210 transmits a signal to the main controller 110. In com-3, CMD3, DATA3, SECT1, and VC3 are transmitted. CMD3 is a command representing com-3, and DATA3 represents data necessary to perform the Auth-4 operation. The main controller 110 may store a table to confirm compatibility of the CRUM chip 210 or the consumable unit 200 in advance. For example, if a plurality of tables are stored, DATA3 may include any of the first index information (index 1) of table 1 and any of the second index information (index 20 of table 2. The main controller 110 may encrypt DATA3 using a session key generated through the first authentication process. SECT1 is a symbol string to inform the last operation of communication using integrity detection data, and VC3 is integrity detection data. The main controller 110 may generate VC3 using CMD3, DATA3, CRC3, SECT1 String and VC1 and VC2 which are integrity detection data that has been generated so far. The CRUM chip 210 that receives com-3 transmits com-4 to the main controller 110. Com-4 may include DATA4, SW4, CRC4, SECT2, VC4, and so on. DATA4 may include the third value which is generated using the first value (value 1) and the second value (value 2) corresponding to the first and second index information received from com-3, respectively. The main controller 110 may confirm whether the CRUM chip 210 or the consumable unit 200 is appropriate for the image forming device 100 by comparing the first, second, and third values confirmed through com-4 with the table. The functions of SW4, CRC4 and SECT2 are disclosed. VC4 is integrity detection data that is generated by using entire previous integrity detection data, VC1, VC2 and VC3. That is, VC1, VC2, VC3 are accumulatively reflected to generate VC4. As the method of accumulatively reflecting is described in the detailed description, repeated explanation will be omitted.

The integrity detection data may be transmitted/received during at least some part of a plurality of authentication processes. In this case, if there is previously-used integrity detection data, the corresponding integrity detection data may be accumulatively reflected. That is, the integrity detection data may be summed up as in Equation 1:

$$VCn \text{ of } SECU(n)=CMD(+)DATA(+)SW(+)CRC(+)Symbol(+)VC(n-1) VCn \text{ of } SECT(n)=CMD(+)DATA(+)SW(+)CRC(+)Symbol(+)VC(1)(+)VC(2)(+) \ldots (+)VC(n-2)(+)VC(n-1)$$ [Equation 1]

In Equation 1, (+) may represent a logical operation equation such as XOR or other encryption algorithm equations. According to [Equation 1], VCn of SECU(n) that is integrity detection data used in the authentication processes except for the final authentication process may be generated by combining each of data to be transmitted and VC(n−1) which is integrity detection data received previously. On the other hand, VCn of SECT(n) that is integrity detection data used for the final authentication process may be generated by combining each of data to be transmitted and the entire integrity detection data transmitted or received in the previous authentication processes. For example, in the case of nth integrity detection data, integrity detection data of 1, 2, . . . , n−1 may be reflected. Accordingly, if there is an error in the process of authentication, the error may be found in the final authentication process and the authentication may be completed, or it may be determined that the authentication is failed.

Figure 19:
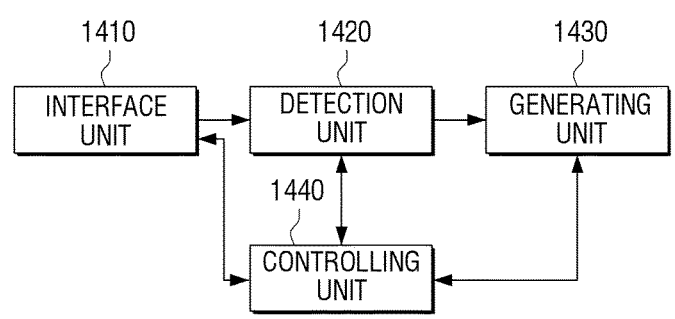
FIG. 19 is a block diagram illustrating a configuration of a CRUM chip according to an exemplary embodiment.

FIG. 19 illustrates an exemplary configuration of a CRUM chip using integrity detection data in an authentication process according to an exemplary embodiment. A CRUM chip 1400 may be mounted in various consumable units and then used. As illustrated in FIG. 19, the CRUM chip 1400 comprises an interface unit 1410, a test unit 1420, a generating unit 1430, and a controller 1440. The interface unit 1410 is a component that may be connected to the main body 100 of an image forming apparatus. The interface unit 1410 may adopt various interface methods. For example, Inter-Integrated Circuit (I2C) may be used.

If an event that requires authentication occurs, the interface unit 1410 may receive various signals. For example, the interface unit 1410 may receive a signal including first data for authentication and first integrity detection data regarding the first data from the main body 100. The first data represents data excluding the first integrity detection data from among the received signals. The first data of FIG. 17 represents CMD1, DATA1, CRC1 and SECU1. DATA1 may include various data such as first random data.

The test unit 1420 may test integrity of a signal by separating the first integrity detection data, that is, VC1 from the received signals. According to a first authentication process of FIG. 17, the test unit 1420 may calculate VC1 by operating CMD1(+)DATA1(+)CRC1(+)SECU1. The text unit 1420 may compare VC1 which is separated from com-1 with VC1 which is directly calculated, and determine that com-1 is integral if they are consistent with each other.

If it is determined that com-1 is integral, the controller 1440 may store some necessary data including VC1 temporarily. The controller 1440 controls the generating unit 1430 to perform the first authentication process.

The generating unit 1430 generates second integrity detection data using second data for authentication with the main body of an image forming device and the first integrity detection data. The generating unit 1430 may generate second random data using a random value generating algorithm. According to the an exemplary embodiment where the above-identified Equation 1 is used, the second integrity detection data may be calculated as a result value of DATA2(+)SW2(+)CRC2(+)SECU2(+)VC1.

The controller 1440 may perform the first authentication operation using data received from the main body 100. The controller 1440 may generate a session key using the first random data (R1) received from the main body 100 and the second random data (R2) generated by the generating unit 1430.

The controller 1440 transmits a signal including the calculated second integrity detection data along with the second data, that is, DATA2, SW2, CRC2 and SECU2 to the main body 100 of an image forming device through the interface unit 1410. The main body 100 of an image forming device may also detect the first and second random data from the received signal and generate a session key using the detected data.

Authentication includes a plurality of times of authentication. That is, the controller 1440 may perform a plurality of subsequent authentication processes after generating a session key using the first and second data.

The plurality of subsequent authentication processes may include an authentication process for a compatibility test as described above with respect to the fourth authentication process. During this authentication process, a new integrity detection data which accumulatively reflects integrity detection data, which has already been transmitted and received, may be transmitted and received.

The interface unit 1410 may receive a signal including third data and third integrity detection data from the main body 100 of an image forming apparatus. The third integrity detection data represents data that is generated using the integrity detection data that has been used by the main body 100 of an image forming device and the main controller 110 so far and the third data. If the fourth authentication process is the final authentication process, all of the first and second integrity detection data may be reflected in order to generate the third integrity detection data.

If the third data and the third integrity data is received, the controller 1440 controls the test unit 1420 to test the data. A testing method is as described above.

If it is determined that there is no problem with the third data based on the test result, the controller 1440 controls the generating unit 1430 to generate the fourth integrity detection data. The generating unit 1430 may generate the fourth integrity detection data by reflecting the fourth data along with the first, second, and third integrity detection data in the above-described Equation 1.

If the fourth integrity detection data is generated, the controller 1440 transmits a signal including the fourth data and the fourth integrity detection data to the main body 100 of an image forming apparatus.

If the fourth authentication process is an authentication process to test compatibility, the third data may include index information of a table pre-stored in an image forming apparatus, and the fourth data may be realized as data including a value corresponding to the index information.

The interface unit 1410 may be realized as a contact-type unit or a connector-type unit. The contact type or the communication method of the interface unit 1410 will be explained later in greater detail.

As described above, the integrity detection data may be used in the process of authentication or data communication in part or in whole depending on exemplary embodiments.

Figure 20:
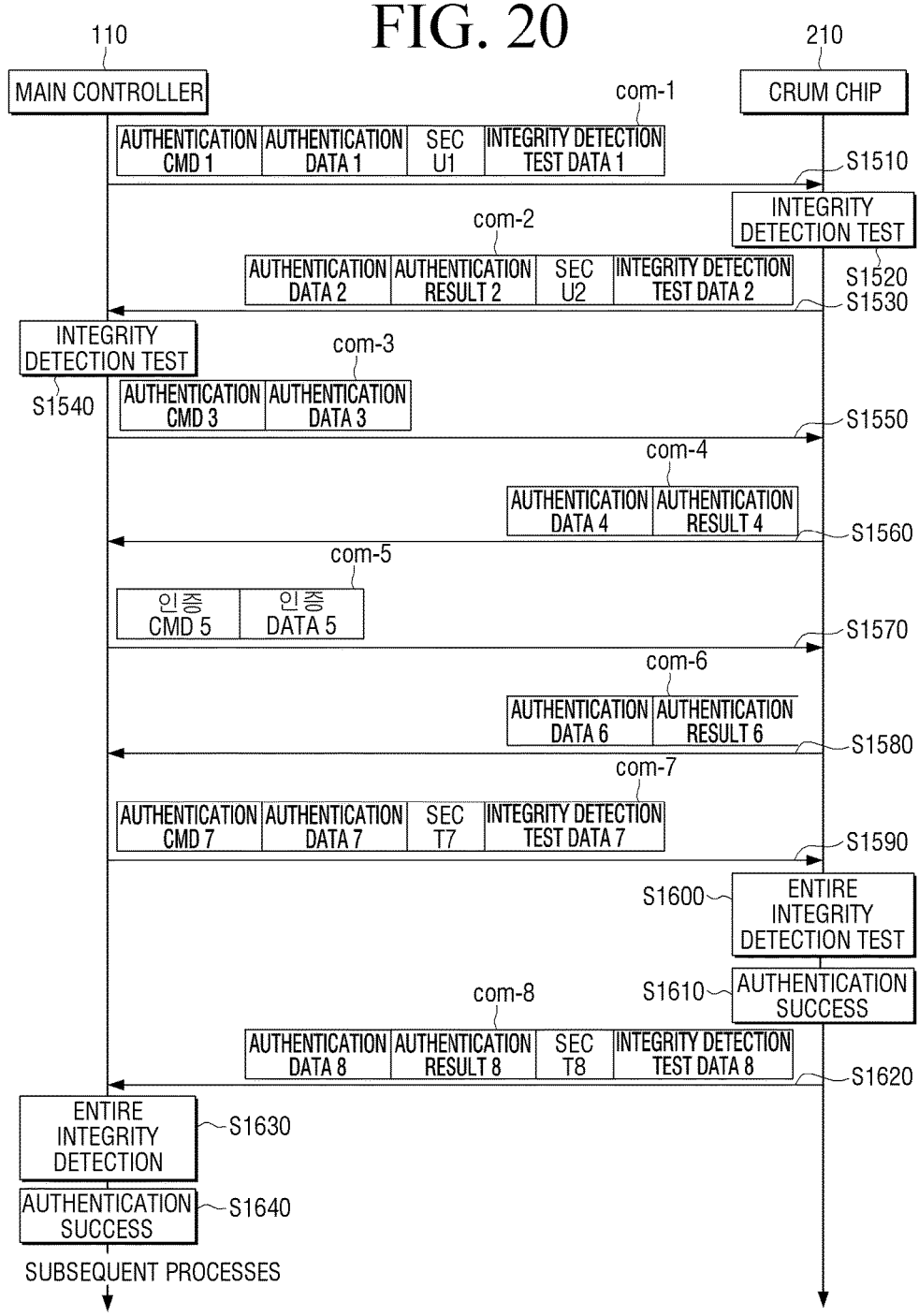
FIG. 20 is a timing view illustrating an authentication process.

FIG. 20 illustrates an exemplary method of utilizing integrity detection data in a communication situation where recording on an image forming device or a consumable unit is not required. Integrity detection data may be used in part of an authentication process.

As illustrated in FIG. 20, the main controller 110 and the CRUM chip 210 perform communication a total of 8 times for authentication, and transmit and check integrity detection data 4 times during the process.

The final integrity test is completed in the last authentication process which is an $8^{th}$ process, and is not used further in the subsequent process which is data read write process. That is, the integrity test process is performed only in authentication 1, 2, 7, and 8, and the overall integrity test is conducted in authentication 7 and 8. In FIG. 20, a process of transmitting/receiving a signal may be referred to as one authentication process. For example, S1510 and S1530 may be the first authentication process, S1550 and S1560 may be the second authentication process, S1570 and S1580 may be the third authentication process, and S1590 and S1620 may be the fourth authentication process.

As illustrated in FIG. 20, the main controller 110 transmits signal com-1 which includes data and integrity detection data 1 (S1510). The data includes authentication start command data 1 (authentication command (CMD) data 1), authentication DATA1, and indicator SEC U1. The authentication start command data 1 includes not only a command, but also data necessary to perform authentication. The SEC U1 represents indicator information which follows the authentication start command data 1. The indicator information SEC U1 represents a symbol to inform a parsing location of integrity detection data within a signal. The indicator information may be represented as a fixed number of bytes. For example, 5 bytes may be used for the indicator information. On the other hand, the size of the authentication data1 may vary according to the contents of data, and accordingly the size of the integrity detection data1 may also vary.

Upon receiving com-1, the CRUM chip 210 performs an integrity test using integrity detection data 1 included in the signal (S1520). Subsequently, the CRUM chip 210 generates integrity detection data 2 using the data to be transmitted and the integrity detection data1 and then, transmits signal com-2 which includes the above data (S1530). The CRUM chip 210 performs the function of a consumable unit according to authentication start command data 1 and configures authentication data 2 by collecting random data which is generated accordingly and data necessary to perform other functions. The CRUM chip 210 configures result data 2 which represents the result of a job which is performed according to the authentication start command data 1. The CRUM chip 210 transmits com-2 which is a signal including authentication data 2, result data 2, indicator SEC U2 and integrity detection data 2 (S1530).

Upon receiving com-2, the main controller 110 separates integrity detection data 2 from the received com-2 and performs integrity test (S1540).

If it is determined that there is an error in at least one of the above-described integrity test operations (S1520, S1540), the main controller 110 or the CRUM chip 210 may stop the authentication process and determine that the authentication is failed. In this case, the main controller 110 may inform the failure of the authentication through the user interface unit 120 which is formed on the main controller 100.

On the other hand, if the integrity is confirmed, the main controller 110 and the CRUM chip 210 perform the subsequent authentication processes sequentially.

In FIG. 20, integrity detection data is not used in the second and the third authentication processes. In this case, even if there is the subsequent authentication job data 3, the main controller 110 transmits com-3 which is a signal including authentication command 3 and authentication data 3 to the CRUM chip 210 without further generating integrity detection data 3 (S1550).

When com-3 is received, the CRUM chip 210 performs a job without performing an integrity test. Specifically, the CRUM chip 210 transmits com-4 which is a signal including authentication data 4 and authentication result data 4 to the main controller 110 (S1560).

The main controller 110 also transmits com-5 which is a signal including authentication command 5 and authentication data 5 without performing an integrity test (S1570), and the CRUM chip 210 transmits com-6 which is a signal including authentication data 6 and authentication result data 6 (S1580). The second and the third authentication processes may be performed without integrity detection data.

The main controller 110 performs integrity detection data again in the final authentication process. That is, the main controller 110 generates integrity detection data 7 using integrity detection data 1 and 2 which is all of the existing integrity detection data along with authentication command 7, authentication data 7, and SECT 7, and transmits com-7 which is a signal including the above data to the CRUM chip 210 (S1590).

The CRUM chip 210 ultimately tests data which is transmitted/received and temporarily stored throughout the entire communication process using integrity detection data 7 (S1600). If the integrity is confirmed according to the final test result, the CRUM chip 210 determines that the authentication is successful (S1610) and performs the next process such as generating data to be transmitted to an image forming apparatus. If there is nothing to record in a memory in the authentication process which indicates that there is no data temporarily stored, the operation of storing data in a non-volatile memory (not shown) may be omitted.

The CRUM chip 210 transmits com-8 which is a signal including authentication data 8, authentication result data 8, SEC T8, and integrity detection data 8 to the main controller 110 (S1620). In order to generate the integrity detection data 8, the integrity detection data 1, 2 and 7 which is all of the data that has been transmitted/received so far is used.

The main controller 110 also performs the entire integrity test using the integrity detection data SEC T8 included in the authentication 8 communication signal received from the CRUM chip (S1630). If integrity is confirmed according to the integrity test (S1640), it becomes an authentication success state, and the main controller 110 performs the subsequent operations such as generating a session key. Likewise, if there is nothing to record in a memory in the authentication process which indicates that there is no data temporarily stored, the operation of storing data in a non-volatile memory (not shown) may be omitted.

The integrity detection data that is used in such a communication process is generated as the previously-used integrity detection data is reflected accumulatively.

For example, integrity detection data may be processed as:

Integrity detection data 1=$E$(authentication CMD/ authentication DATA 1/SEC $U$1)

Integrity detection data 2=$E$(authentication data 2/authentication result 2/SEC $U$2/integrity detection data 1)

Integrity detection data $T$1=$E$(authentication CMD 7/authentication data 7/integrity detection data 1/integrity detection data 2)

Integrity detection data $T$2=$E$(authentication data 8/authentication result 8/SEC $T$2/integrity detection data 1/integrity detection data 2/integrity detection data $T$1)

In the above equations, E ( )represents a function for obtaining a result value by applying a predetermined equation. As illustrated in FIGS. 17 and 18, the data that is represented as authentication data or authentication result may include verification data such as ckecksum or MAC which has been used for individual communication stability.

Integrity detection data that is used for some of the authentication process may be configured as illustrated in FIGS. 21-24. Specifically, FIGS. 21-24 describe the process of generating new integrity detection data using the previous integrity detection data, according to the logical operations. The method described in FIGS. 21-24 can be used for the above-described various exemplary embodiments, but is not necessarily limited to such embodiments.

Figure 21:
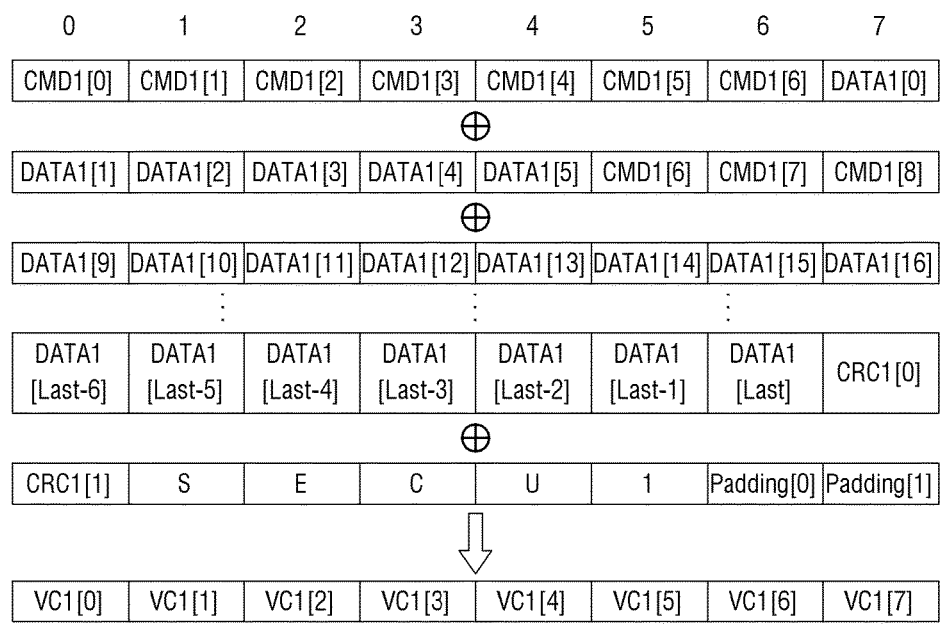
FIGS. 21 to 24 illustrate an exemplary method for generating integrity detection data used for each authentication process.

FIG. 21 illustrates first integrity detection data that the main controller 110 transmits to the CRUM chip 210 during the first authentication process. As illustrated in FIG. 21, the main controller 110 generates a new 8 byte value by applying the first 8 bytes and the next 8 bytes of communication data to a specific logical operation, mathematical equation or encryption algorithm, and generates the next value by operating the newly-generated 8 byte value with the next 8 bytes. FIG. 21 illustrates that XOR operation is used, but logical operation is not limited to XOR operation, and other various logical operations can be used. The main controller 110 may generate integrity detection data by applying the same equation or algorithm until SECU 1 and store the generated integrity detection data temporarily. If the number of data of the final 8 bytes does not amount to 8 bytes, a specific value such as 0x00 may be padded to complete 8 bytes, and the operation of insufficient bytes may be omitted.

When integrity detection data (VC) is generated, the integrity detection data that was used right before should be used. However, the integrity detection data VC1 illustrated in FIG. 21 may be transmitted for the first time, and there is no previous integrity detection data. In this case, integrity initial data that is initialized as a specific value such as 0x00 may be used, or an operation may be performed without including the previous integrity data. Such conditions may not be applicable if an image forming device and a CRUM chip generate integrity data using the same method.

If com-1 is received during the first authentication process, the CRUM chip examines CMD and DATA values using CRC to check whether there is an error. Specifically, the CRUM chip detects VC1 by separating VC1 from the received com-1, and performing the same logical operation as the main controller for the remaining data. When comparing detected VC1 with received VC1, if they are identical, it is determined that the data is not in an error state, and if they are not identical, it is determined that the data is in an error state.

If there is an error or any problem in verifying integrity data, the CRUM chip does not perform the next authentication process. In this case, the image forming device may check an error of the CRUM chip and accordingly, may stop or restart an operation. If there is no error or problem in examining integrity data, the image forming device temporarily stores VC1 and performs the next operation.

The CRUM chip 210 performs an operation for encryption authentication according to contents of DATA and generates com-2 having encryption-related data to be used in an image forming apparatus, specific data stored in the CRUM chip 210, a serial number of the CRUM chip, and random data as DATA. The CRUM chip 210 may be encrypted using an encryption method using all or part of the DATA as a symmetric or asymmetric key. The contents of com-2 include DATA, SW indicating whether a job has been successful or failed according to a received command, CRC which is an error detection code, a symbol, VC1 and VC2. In the case of com-2, the symbol is set to be SECU2 String. The integrity detection data 2, that is, VC2 may be generated using the method illustrated in FIG. 22.

Figure 22:
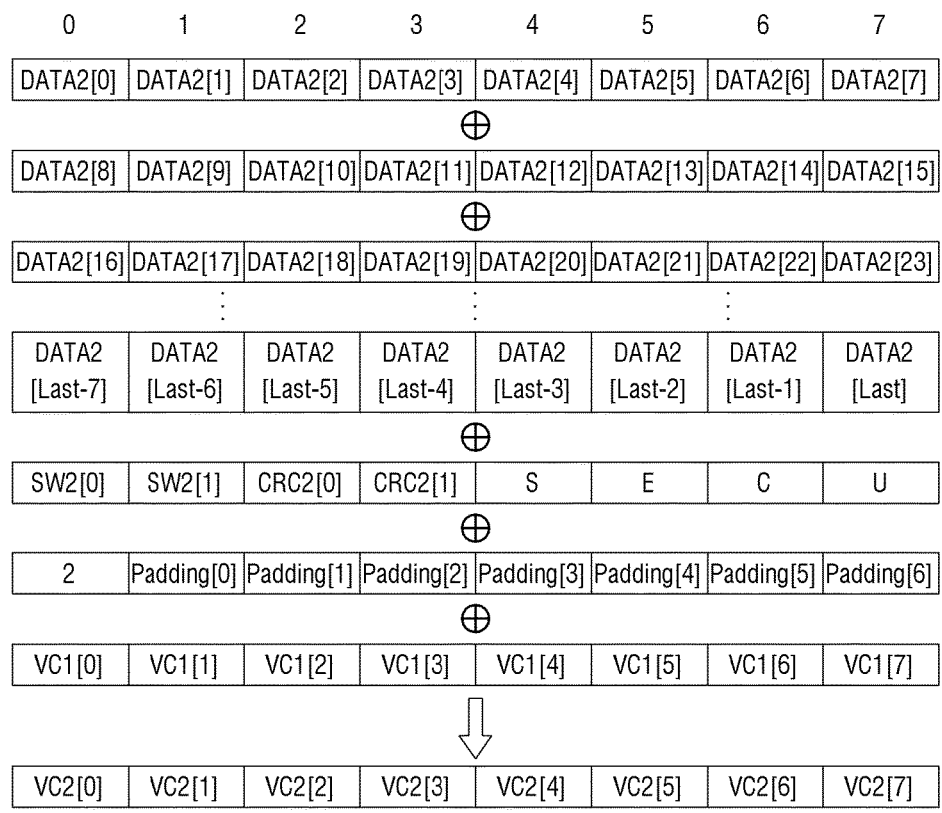

As illustrated in FIG. 22, DATA2, SW2, CRC2, SECU2, and VC1 are categorized by 8 bytes, and each of the categorized data is computed sequentially using a specific equation or an encryption algorithm. Padding may be used depending on the length of data. Accordingly, XOR operation can be performed for DATA2, SW2, CRC2, SECU2, and the previous integrity detection data VC1 in a unit of 8 bites. A result value of the operation can be VC2. Consequently, VC1 is accumulatively reflected to generate VC2. The generated VC2 is temporarily stored in the CRUM chip 210.

Figure 23:
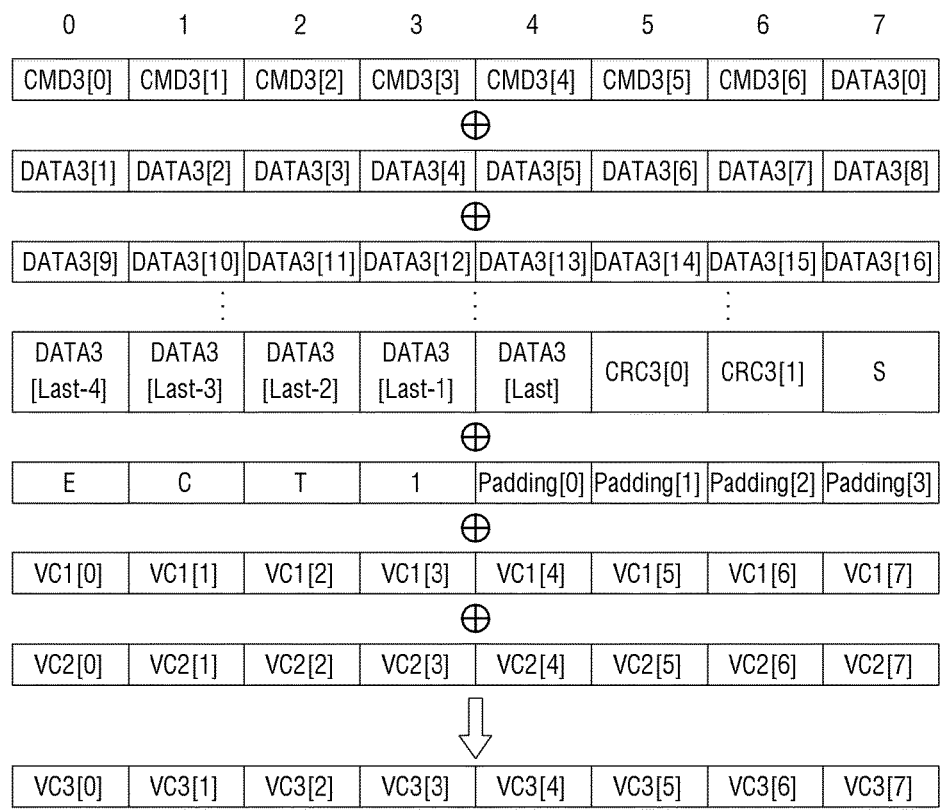
Figure 24:
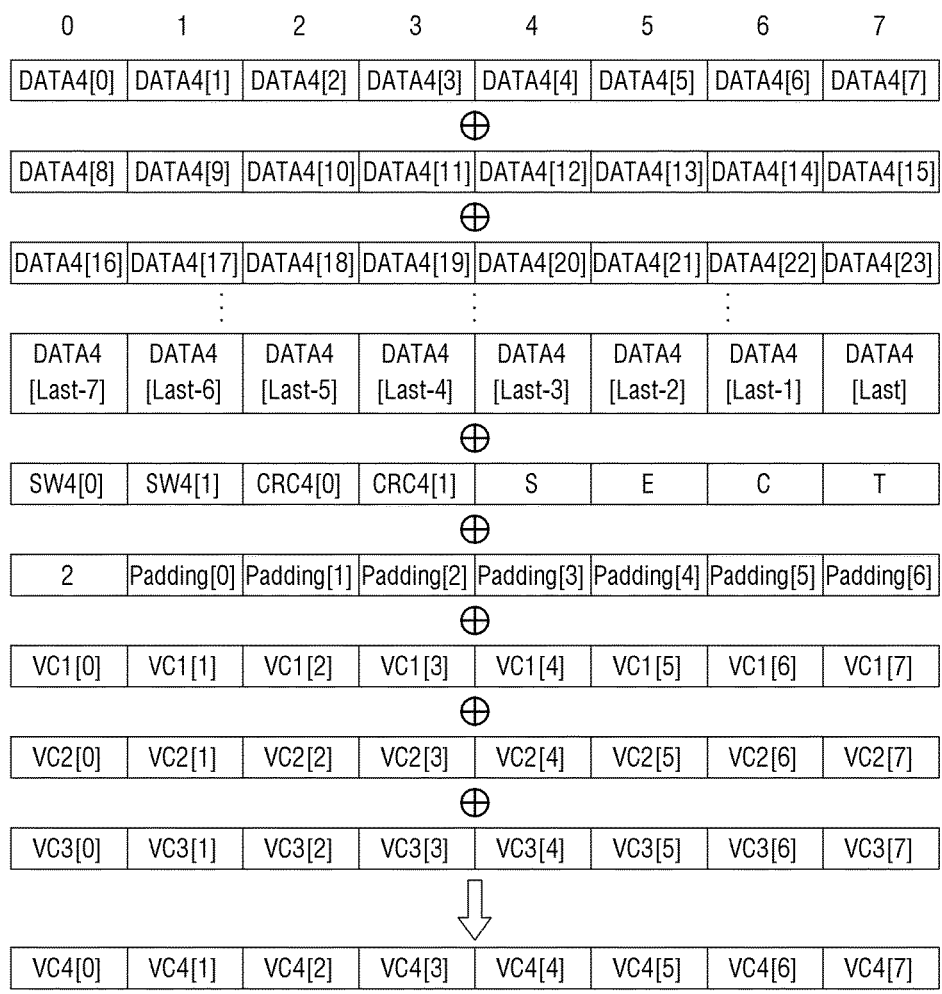

FIGS. 23 and 24 illustrate an exemplary method and configuration for generating integrity detection data that is used in the fourth authentication process.

For example, in FIG. 20, the main controller 10 uses integrity detection data when transmitting com-7, and the CRUM chip 210 uses integrity detection data when transmitting com-8.

Com-7 includes CMD representing com-7, DATA necessary for Auth-4 operation, CRC, and symbol string and VC3 indicating the end of communication utilizing integrity detection data. In this case, the DATA is encrypted using a session key generated in Auth-1. The symbol string of com-7 is SECT1.

As illustrated in FIG. 23, VC3 is generated using CMD3, DATA3, CRC3, SECT1 String, and VC1 and VC2 that is all the integrity detection data that has been generated so far. The main controller 110 temporarily stores the generated VC3. When com-7 is received, the CRUM chip 210 generates integrity detection data in the same manner as illustrated in FIG. 23. As VC1 and VC2 are temporarily stored in the CRUM chip 110 during Auth-1 process, integrity detection data which is the same as VC3 may be generated. If there is a problem in verifying the integrity data, the CRUM chip does not perform the next authentication process. In this case, the image forming device may check an error of the CRUM chip and accordingly, may stop or restart an operation.

If there is no problem in verifying the integrity data, the CRUM chip 210 decrypts the DATA to a session key, performs operations necessary for Auth-4, and generates com-8 data to respond to the image forming apparatus. Com-8 includes DATA, SW, CRC, SECT2 String which are necessary for Auth-4 and VC4 which is final integrity data. The DATA is encrypted to a session key.

FIG. 24 illustrates an exemplary method and configuration for generating VC4. As illustrated in FIG. 24, the CRUM chip 210 may generate VC4 by computing DATA4, SW4, CRC4, SECT2 String and VCI, VC2, VC3 by 8 bytes sequentially.

When com-8 is received, the main controller 110 of the image forming device generates VC4 using DATA4, SW4, CRC4, SECT2 String and VC1, VC2, VC3 which are temporarily stored in the main body 100 of the image forming device and compares them to confirm integrity. If there is no problem in the integrity test, DATA is decrypted to a session key to perform a final authentication operation. Accordingly, when the CRUM chip 210 or the consumable unit 200 where the CRUM chip 210 is mounted is confirmed to be compatible with the image forming device 100, it is determined that a final authentication is successful and the subsequent communication operation may be performed.

The consumable unit 200 may be detachable from the main body 100 of the image forming apparatus. When the consumable unit 200 is mounted, it may be connected to the main body 100 electrically. Such connection may be realized in a contact-type or a connector-type, and communication between the consumable unit 200 and the main body 100 may be performed using a I2C method.

In FIGS. 21-24, it is explained that VC4 is generated by using entire VC1, VC2, and VC3, but according to another exemplary embodiment, it is also explained that VC4 can be generated by using one part of VC1, VC2, and VC3 respectively. Citing an authentication process in FIG. 21 as an example, integrity detection test data 2 can be generated using at least one part of integrity detection test data 1. In addition, in a subsequent authentication process, integrity detection test data 7 can be generated using at least one part of integrity detection test data 1, and at least one part of integrity detection test data 2. The main controller and the CRUM chip, in each authentication process, store integrity detection test data transmitted and received, and use the stored integrity detection test data in a final authentication process.

Figure 25:
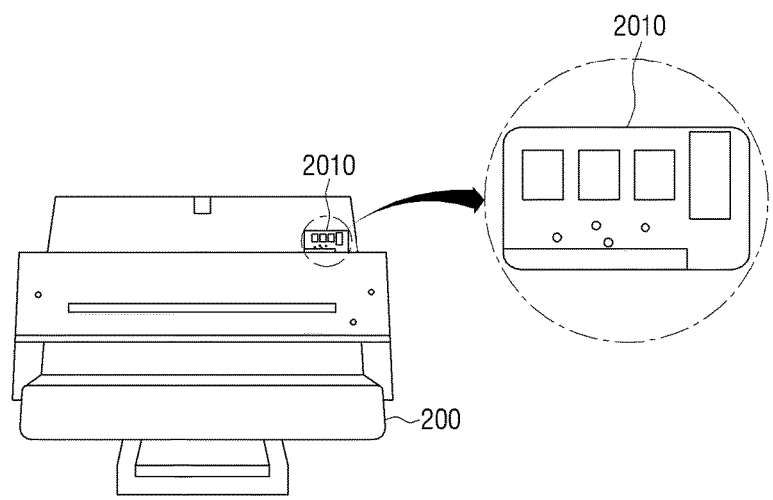
FIGS. 25 to 27 illustrating an exemplary connecting a consumable unit to a main body of an image forming apparatus.

FIG. 25 illustrates an example of the external configuration of the interface unit 1410 in a contact-type. As illustrated in FIG. 25, the consumable unit 200 includes a contact unit 2010 for communication. The main body 100 of the image forming device includes a contact unit. When the consumable unit 100 is mounted on the main body 100, the interface unit 1410 contact the contact unit 2010 formed on the main body 100 of the image forming device to be connected electrically.

Figure 26:
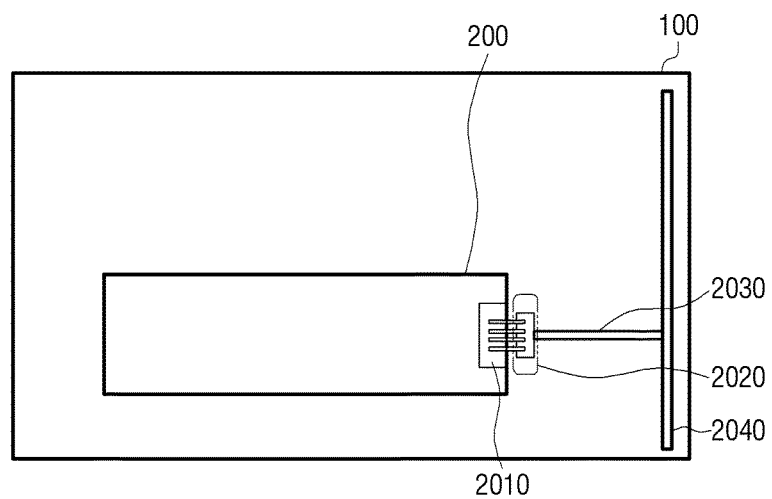

FIG. 26 illustrates an exemplary connection state between the consumable unit 200 in a contact-type and the main body 100 of the image forming apparatus. FIG. 26 illustrates a contact unit 2020, a main board 2040 where various parts including the main controller 110 may be disposed, and a connection cable 2030 to connect the main board 2040 with the contact unit 2020. When the consumable unit 200 is mounted on the main body 100 as illustrated in FIG. 26, the contact unit 2010 formed on the consumable unit 200 contacts the main body 100 to be connected with each other electrically.

When contact units are of a contact-type as illustrated in FIG. 25 and FIG. 26, there is nothing to fix the contacted sides. Therefore, if there is oscillation in the image forming apparatus, the contact units 2010, 2020 may separate from each other temporarily, causing problems in communication. That is, if the contact points of consumable units mounted on the image forming device separate, incorrect data may be exchanged. However, if integrity detection data is used in performing authentication and data communication as described above, such problems may be resolved. That is, the main controller 110 or the CRUM chip 210 may determine authentication failure or communication error by checking integrity detection data of the previous data which has been received when contacts points are normally attached to each other and data which is received while contact points are unstably attached to each other. Accordingly, the operation of reading or writing data may not be performed, preventing wrong information from being recorded in the consumable unit 200.

Figure 27:
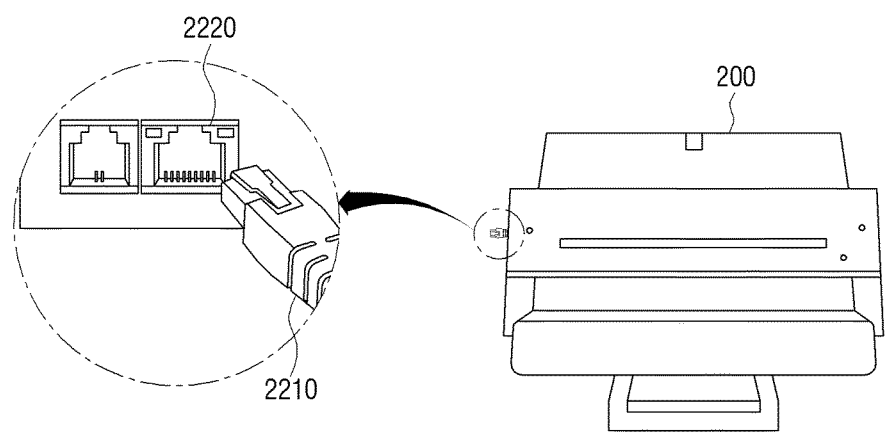

FIG. 27 illustrates an exemplary external configuration of the interface unit 1410 as a connector-type. Referring to FIG. 27, the consumable unit 200 includes a connector 2210 for communication. The connector 2210 is connected to a port 2220 that may be on the main body 100 of the image forming apparatus. In the connector-type, contact problems may occur, for example, if a foreign substance gets in between the connector 2210 and the port 2220 or if a fixing unit is damaged when the interface unit 1410 is a connector-type as illustrated in FIG. 27. In this case, an exemplary embodiment of the present invention may prevent incorrect an operation from being performed by performing authentication or data communication using integrity detection data according to various exemplary embodiments.

A serial communication method may be used for communication between the consumable unit 200 and the main body 100 of the image forming apparatus. For example, an I2C communication method may be used.

Figure 28:
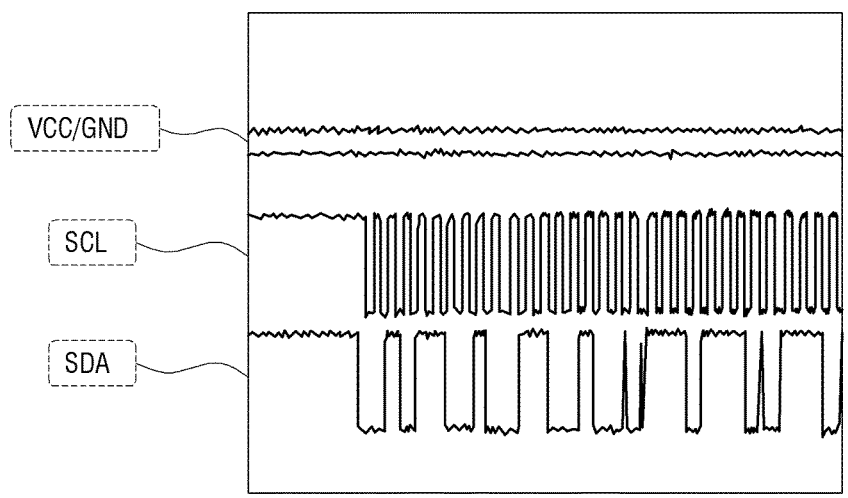
FIG. 28 illustrating an exemplary wave form of a signal which is transmitted and received according to an I2C interface method.

FIG. 28 illustrates exemplary various wave forms of a signal that may be transmitted and received between the consumable unit 200 and the main body 100 of the image forming device according to a I2C communication method. The I2C communication method includes VCC and GND that supply power to a slave, SCL that provides a clock for synchronization between the main controller 110 and the CRUM chip 210, SDA which is a data line of I2C interface, and so on. As such, the I2C communication has a simple structure and may connect a plurality of nodes to one bus.

The I2C communication method may be prepared for communication between ICs in a circuit of one board, and thus there is no configuration for checking errors during communication. However, various communication errors may occur during a communication process between the consumable unit and the image forming apparatus.

An unpredictable resistance may occur, for example, electrical noise interference may occur on the contact surface, communication may be affected by dust, toner power, and so on, or the contact points of contact surfaces may separate due to oscillation. Further, incorrect communication data may be transmitted in the I2C communication method as clocks (SCL) become inconsistent, and transmission data (SDA) is changed.

Figure 29:
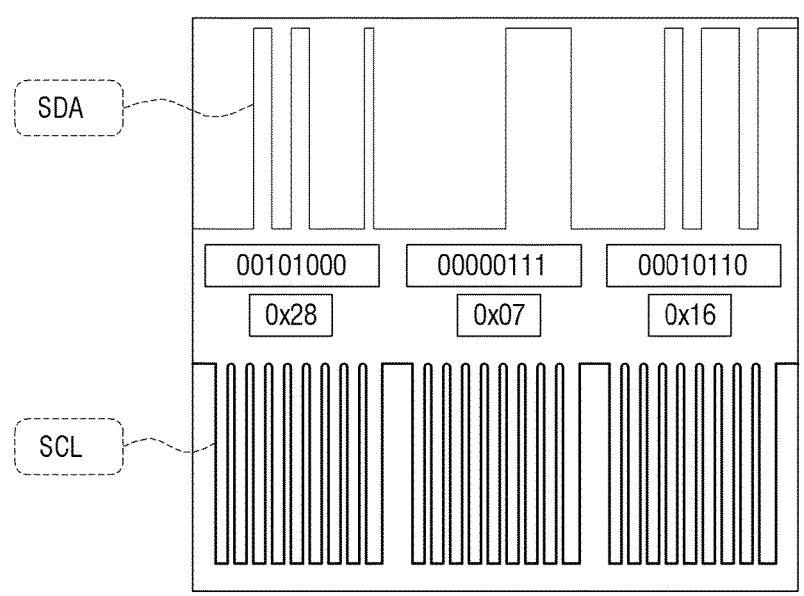
FIG. 29 is a view magnifying in exemplary part of the signal in FIG. 28.

FIG. 29 illustrates an enlarged SDA and SCL in the I2C signal of FIG. 28. As illustrated in FIG. 29, a SCL signal has 8 consistent high/low signals at once and 1 byte of data is represented as high/low signals are generated with SDA accordingly. That is, one high/low signal represents 1 bit in SCL or SDA.

According to an I2C method, if a problem occurs during communication, that is, if there is distortion of signal only by 1 bit, it is not possible to transmit data normally. For example, if there is a problem in transmitting 4 byte data, 00000000 00000000 00000000 00000000 ("0" as a decimal number), and thus only the very first digit of 1 bit is changed, there may be a considerable difference as it becomes 10000000 00000000 00000000 00000000 ("2147483648" as a decimal number).

However, according to an exemplary embodiment of the present invention, even if such an error occurs during communication, data may be tested immediately using the integrity detection data that has been transmitted or received previously, and integrity of the entire data may also be checked in the final operation using the integrity detection data. Accordingly, even if the interface unit 1410 is connected to the main body in a contact-type or a connector-type, or communication between the main body 100 and the consumable unit 200 is performed according to the I2C communication method, recording wrong data due to incorrect authentication or incorrect communication may be prevented.

The method for authentication and communication according to an exemplary embodiment may be coded as software respectively, and recorded in a non-transitory recordable medium. The non-transitory recordable medium may be installed in an image forming apparatus, a consumable unit, or in a CRUM chip, and/or in various types of apparatuses, and accordingly, the above-described authentication and communication method may be realized in various apparatuses.

The non-transitory recordable medium refers to a medium that may store data semi-permanently rather than storing data for a short time such as a register, a cache, and a memory and may be readable by an apparatus. The above-mentioned various applications or programs may be stored in a non-temporal recordable medium such as CD, DVD, hard disk, Blu-ray disk, USB, memory card, and ROM and provided therein. Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A Customer Replaceable Unit Monitoring chip (CRUM chip) operable to communicate with an image forming apparatus, the CRUM chip comprising:
   at least one contact configured to receive a first data set and first integrity detection data regarding the first data set from a main controller of the image forming apparatus connecting with the at least one contact, the first data set comprising first command data, first data, first CRC data, and first symbol data; and
   a processor configured to test integrity of the first data set using the first integrity detection data, to generate a second data and a second integrity detection data to be transmitted to the main controller in response to integrity of the first data set being verified, the second data set comprising second data, second result data, and second CRC,
   wherein the processor further configured to generate the second integrity detection data using the second data set and the received first integrity detection data.

2. The CRUM chip according to claim 1, wherein the processor further configured to control the at least one contact to transmit the second data set and the second integrity detection data to the main controller of the image forming apparatus through the at least one contact in response to integrity of the first data being verified.

3. The CRUM chip according to claim 1, further comprising:
   a memory configured to store the first integrity detection data and the second integrity detection data.

4. The CRUM chip according to claim 1, wherein the processor further configured to generate fourth integrity detection data using the first to third integrity detection data and a fourth data set to be transmitted to the main controller of the image forming apparatus, in response to a third data set and third integrity detection data regarding the third data being received from the main controller of the image forming apparatus, and to transmit the fourth data set and the fourth integrity detection data to the main controller of the image forming apparatus through the at least one contact,
   the third data set comprising third command data, third data, third CRC data, and third symbol data, and
   the fourth data set comprising fourth data, fourth result data, and fourth CRC.

5. The CRUM chip according to claim 4, wherein the processor further configured to test integrity of the third data using the third integrity detection data and the stored first to second integrity detection data.

6. The CRUM chip according to claim 1, wherein the processor further configured to generate a session key using the first data set and the second data set, and to perform an authentication process for synchronizing a first table stored in each of the main controller of the image forming apparatus and the CRUM chip, an authentication process for synchronizing a second table stored in each of the main controller of the image forming apparatus and the CRUM chip, and an authentication process for determining compatibility between the image forming apparatus and the CRUM chip based on at least one of the first table and the second table.

7. The CRUM chip according to claim 1, wherein the second data comprise any one of random data, a chip serial number (CSN), information regarding a key used for an asymmetric key algorithm, internal information of the CRUM chip, and result information on result of a job performed in the CRUM chip.

8. The CRUM chip according to claim 1, wherein the first data comprises a first arbitrary value, and the second data comprises a second arbitrary value and a Message Authentication Code generated using the first data and the second data.

9. A consumable apparatus, comprising:
a consumable part including a mount and that is mountable on an image forming apparatus; and
a CRUM chip mountable on the mount of the consumable part,
wherein the CRUM chip configured to receive a first data set and first integrity detection data regarding the first data set from a main processor of the image forming apparatus, to test integrity of the first data set using the first integrity detection data, and to generate the second integrity detection data using the second data set and the received first integrity detection data in response to integrity of the first data set being verified,
wherein the first data set comprising first command data, first data, first CRC data, and first symbol data, and
wherein the second data set comprising second data, second result data, and second CRC.

10. The consumable apparatus according to claim 9, wherein the consumable part is any one of an electrification part, a light exposure part, a developing part, a transfer part, a settlement part, a roller, a belt, and an OPC drum.

11. The CRUM chip according to claim 1, wherein the interface includes an Inter-Integrated Circuit (I2C).

12. An image forming apparatus, comprising:
a main processor configured to control operations of the image forming apparatus; and
a Customer Replaceable Unit Monitoring chip (CRUM chip) configured to store information regarding a consumable unit,
wherein the main processor is operable to transmit to the CRUM chip a first data set and first integrity detection data regarding the first data set, the first data set comprising first command data, first data, first CRC data, and first symbol data,
wherein the CRUM chip is operable:
to test integrity of the first data set using the first integrity detection data, and
to generate second integrity detection data using both a second data set to be transmitted to the main processor and the first integrity detection data in response to the first data set and the first integrity detection data being received, the second data set comprising second data, second result, data, and second CRC.

13. The image forming apparatus according to claim 12, wherein the CRUM chip is operable to transmit the second data set and the second integrity detection data to the main processor in response to integrity of the first data set being verified.

14. The image forming apparatus according to claim 12, wherein the main processor and the CRUM chip are operable to perform an authentication through a plurality of authentication processes,
wherein the main processor is operable:
to generate third integrity detection data using a third data set, the first integrity detection data, and the second integrity detection data in a final authentication process from among the plurality of authentication processes, the third data set comprising third command data, third data, third CRC data, and third symbol data, and
to transmit the third data set and the third integrity detection data to the CRUM chip,
wherein the CRUM chip is operable to generate fourth integrity detection data using fourth data set and the first to third integrity detection data, in response to receiving the third data set and the third integrity detection data, and to transmit the fourth data set and the fourth integrity detection data to the main processor, the fourth data set comprising fourth data, fourth result data, and fourth CRC.

15. The image forming apparatus according to claim 14, wherein the CRUM chip is operable to test integrity of the third data set using the first to third integrity detection data.

16. The image forming apparatus according to claim 14, wherein the main processor is operable to test integrity of the fourth data set using the fourth integrity detection data, in response to the fourth data set and the fourth integrity detection data being received.

17. The image forming apparatus according to claim 14, wherein the plurality of authentication processes include a first authentication process in which the main processor and the CRUM chip are operable to transmit and receive the first data and the second data and to generate a session key respectively, a second authentication process for synchronizing a first table stored in each of the main processor of the image forming apparatus and the CRUM chip, a third authentication process for synchronizing a second table stored in each of the main processor of the image forming apparatus and the CRUM chip, and a fourth authentication process in which the main processor and the CRUM chip are operable to transmit and receive the third data and the fourth data and to determine compatibility between the image forming apparatus and the CRUM chip.

18. The image forming apparatus according to claim 12, wherein the main processor and the CRUM chip are operable to store integrity detection data used for the plurality of authentication processes respectively, and to perform data communication, in response to the authentication being completed.

19. An authenticating method of a Customer Replaceable Unit Monitoring chip (CRUM chip) operable to communicate with an image forming apparatus, comprising:
receiving, from a main processor of the image forming apparatus, a first data set and first integrity detection data regarding the first data set, the first data set comprising first command data, first data, first CRC data, and first symbol data;
testing integrity of the first data set using the first integrity detection data; and
generating second integrity detection data using both a second data set to be transmitted to the main processor of the image forming apparatus and the first integrity detection data in response to integrity of the first data set being verified, the second data set comprising second data, a second result data, and second CRC.

20. The method according to claim 19, further comprising:
transmitting the second data set and the second integrity detection data to the main processor of the image forming apparatus, the second data set comprising second data, second result data, and second CRC.

21. The method according to claim 19, further comprising:
storing the first and second integrity detection data.

22. The method of claim 19, further comprising:
receiving, from the main processor of the image forming apparatus, a third data set and third integrity detection data regarding the third data set, the third data set comprising third command data, third data, third CRC data, and third symbol data;

generating fourth integrity detection data using fourth data set to be transmitted to the main processor of the image forming apparatus and the first to third integrity detection data, the fourth data set comprising fourth data, fourth result data, and fourth CRC; and transmitting the fourth data set and the fourth integrity detection data to the main processor of the image forming apparatus.

23. The method of claim 22, further comprising:

testing integrity of the third data set using the third integrity detection data and the stored first to second integrity detection data.

24. The method according to claim 19, further comprising:

generating a session key using the first data and the second data; and in response to a session key being completed, sequentially performing an authentication process for synchronizing a first table stored in each of the main processor of the image forming apparatus and the CRUM chip, an authentication process for synchronizing a second table stored in each of the main processor of the image forming apparatus and the CRUM chip, and an authentication process for determining compatibility between the image forming apparatus and the CRUM chip based on at least one of the first and the second tables.

* * * * *